United States Patent
Horiguchi

(10) Patent No.: US 11,852,524 B2
(45) Date of Patent: Dec. 26, 2023

(54) OPTICAL MEASUREMENT APPARATUS

(71) Applicants: YOKOGAWA ELECTRIC CORPORATION, Tokyo (JP); Yokogawa Test & Measurement Corporation, Tokyo (JP)

(72) Inventor: Atsushi Horiguchi, Tokyo (JP)

(73) Assignees: YOKOGAWA ELECTRIC CORPORATION, Tokyo (JP); Yokogawa Test & Measurement Corporation, Tokyo (JP)

( * ) Notice: Subject to any disclaimer, the term of this patent is extended or adjusted under 35 U.S.C. 154(b) by 101 days.

(21) Appl. No.: 17/644,185

(22) Filed: Dec. 14, 2021

(65) Prior Publication Data

US 2022/0214212 A1 Jul. 7, 2022

(30) Foreign Application Priority Data

Dec. 24, 2020 (JP) ................................. 2020-215721

(51) Int. Cl.
*G01J 1/18* (2006.01)

(52) U.S. Cl.
CPC ........... *G01J 1/18* (2013.01); *G01J 2001/186* (2013.01)

(58) Field of Classification Search
CPC ........ G01J 1/18; G01J 1/42; G01J 1/44; G01J 2001/186; G01J 2001/446; G01K 7/124; H03F 3/45475
USPC ............................... 356/213–226; 250/214 A
See application file for complete search history.

(56) References Cited

U.S. PATENT DOCUMENTS

| | | | | | |
|---|---|---|---|---|---|
| 4,465,370 A | * | 8/1984 | Yuasa | ........................ | G01J 1/46 341/139 |
| 4,847,483 A | * | 7/1989 | Nishibe | ..................... | G01J 1/44 250/214 AL |
| 4,919,534 A | * | 4/1990 | Reed | ..................... | B07C 5/3416 356/402 |
| 5,737,111 A | * | 4/1998 | Mori | .................. | H04B 10/6933 398/209 |

(Continued)

FOREIGN PATENT DOCUMENTS

| | | |
|---|---|---|
| JP | 2-90025 A | 3/1990 |
| JP | 3-188337 A | 8/1991 |

(Continued)

*Primary Examiner* — Hoa Q Pham
(74) *Attorney, Agent, or Firm* — Rankin, Hill & Clark LLP

(57) ABSTRACT

An optical measurement apparatus having an improved light intensity detection performance is provided. The optical measurement apparatus includes a light receiving element capable of converting a light intensity of light to be analyzed into an electrical signal; an input terminal to which the electrical signal is input; a first amplifier and a nonlinear element configuring a logarithmic amplifier; offset resistors; a switch unit; and a controller. An inverting input terminal of the first amplifier is electrically connected to the input terminal. The offset resistors have different resistance values. The switch unit can switch an offset resistor electrically connected between the voltage source and the input terminal, of the offset resistors. An offset current is input to the input terminal by the offset resistor electrically connected between the voltage source and the input terminal. The controller measures the light intensity based on an output voltage value of the first amplifier.

10 Claims, 16 Drawing Sheets

(56) References Cited

U.S. PATENT DOCUMENTS

| | | | | |
|---|---|---|---|---|
| 5,799,216 | A * | 8/1998 | Teremy | G01J 1/42 |
| | | | | 356/404 |
| 6,784,987 | B2 | 8/2004 | Minneman et al. | |
| 7,022,967 | B2 * | 4/2006 | Horiguchi | G01J 1/44 |
| | | | | 250/214 R |
| 2022/0065709 | A1 * | 3/2022 | Li | H03F 1/083 |

FOREIGN PATENT DOCUMENTS

| | | |
|---|---|---|
| JP | 5-54159 A | 3/1993 |
| JP | 9-266414 A | 10/1997 |
| JP | H1022521 | 1/1998 |
| JP | 10-255301 A | 9/1998 |
| JP | 2003185497 | 7/2003 |
| JP | 2003-317092 A | 11/2003 |
| JP | 2005121418 | 5/2005 |
| JP | 2006134928 | 5/2006 |
| JP | 2007-198792 A | 8/2007 |
| JP | 2009-49488 A | 3/2009 |
| JP | 2012-2798 A | 1/2012 |

* cited by examiner

FIG. 3

| Measurement sensitivity | Noise level | Measurement speed | Resistance value Rs30 (offset resistance) | Changeover switch | Current Ioff | Cutoff frequency fc |
|---|---|---|---|---|---|---|
| Sensitivity A | −50 dBm | ×1000 | 1 M (R30-1) | SW30-1 | 200 nA | 1 MHz |
| Sensitivity B | −60 dBm | ×100 | 10 M (R30-2) | SW30-2 | 20 nA | 100 kHz |
| Sensitivity C | −70 dBm | ×10 | 100 M (R30-3) | SW30-3 | 2 nA | 10 kHz |
| Sensitivity D | −80 dBm | ×1 | 1 G (R30-4) | SW30-4 | 200 pA | 1 kHz |

FIG. 7

| Measurement sensitivity | Noise level | Measurement speed | Feedback resistance value | Cutoff frequency fc |
|---|---|---|---|---|
| Low sensitivity | High | Fast | Low | High band |
| Medium sensitivity | Medium | Moderate | Medium | Medium band |
| High sensitivity | Low | Slow | High | Low band |

FIG. 10
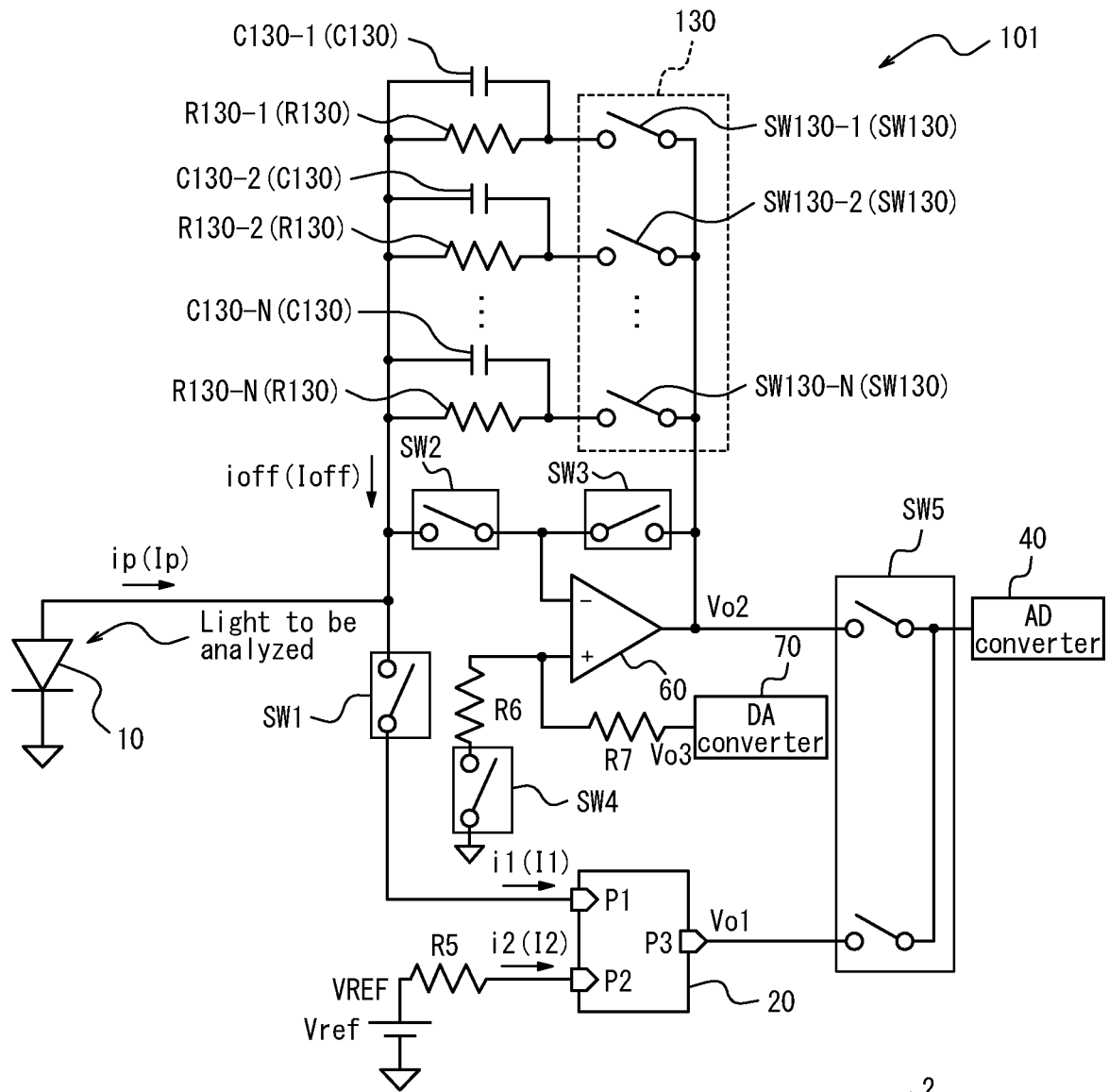
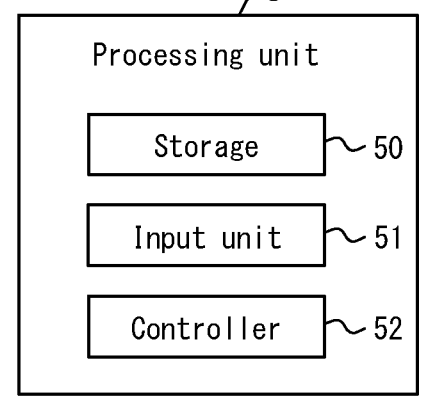

FIG. 12

| Output voltage value Vol1 (digital data) | Current value I1 |
|---|---|
| AAA | aaa |
| ... | ... |
| BBB | bbb |
| ... | ... |
| CCC | ccc |

OPTICAL MEASUREMENT APPARATUS

CROSS-REFERENCE TO RELATED APPLICATION

The present application claims priority to Japanese Patent Application No. 2020-215721 filed on Dec. 24, 2020, the entire contents of which are incorporated herein by reference.

TECHNICAL FIELD

The present disclosure relates to an optical measurement apparatus.

BACKGROUND

Apparatuses for measuring the light intensity of light to be analyzed are conventionally known (see PTL 1, for example). The photoelectric conversion circuit disclosed in PTL 1 includes an amplifier having a negative feedback path for logarithmic amplification loaded with a logarithmic conversion element and a negative feedback path for linear amplification loaded with a resistor connected in parallel.

CITATION LIST

Patent Literature

PTL 1: JP H02-090025 A

SUMMARY

An optical measurement apparatus according to some embodiments includes: a light receiving element capable of converting a light intensity of light to be analyzed into an electrical signal; an input terminal to which the electrical signal is input; a first amplifier and a nonlinear element configuring a logarithmic amplifier, an inverting input terminal of the first amplifier being electrically connected to the input terminal; a plurality of offset resistors having resistance values different from each other; a switch unit capable of switching an offset resistor to be electrically connected between a voltage source and the input terminal, of the plurality of offset resistors; and a controller, wherein an offset current is input to the input terminal by the offset resistor electrically connected between the voltage source and the input terminal, and the controller measures the light intensity based on an output voltage value of the logarithmic amplifier.

BRIEF DESCRIPTION OF THE DRAWINGS

In the accompanying drawings:

FIG. 3 is a diagram illustrating an example of settings of the measurement sensitivities;

FIG. 7 is a diagram illustrating an example of settings of the measurement sensitivities according to the first comparative example;

FIG. 10 is a block diagram of an optical measurement apparatus according to a second embodiment of the present disclosure;

FIG. 12 illustrates an example of a table indicating current values versus output voltage values;

DETAILED DESCRIPTION

Figure 1:
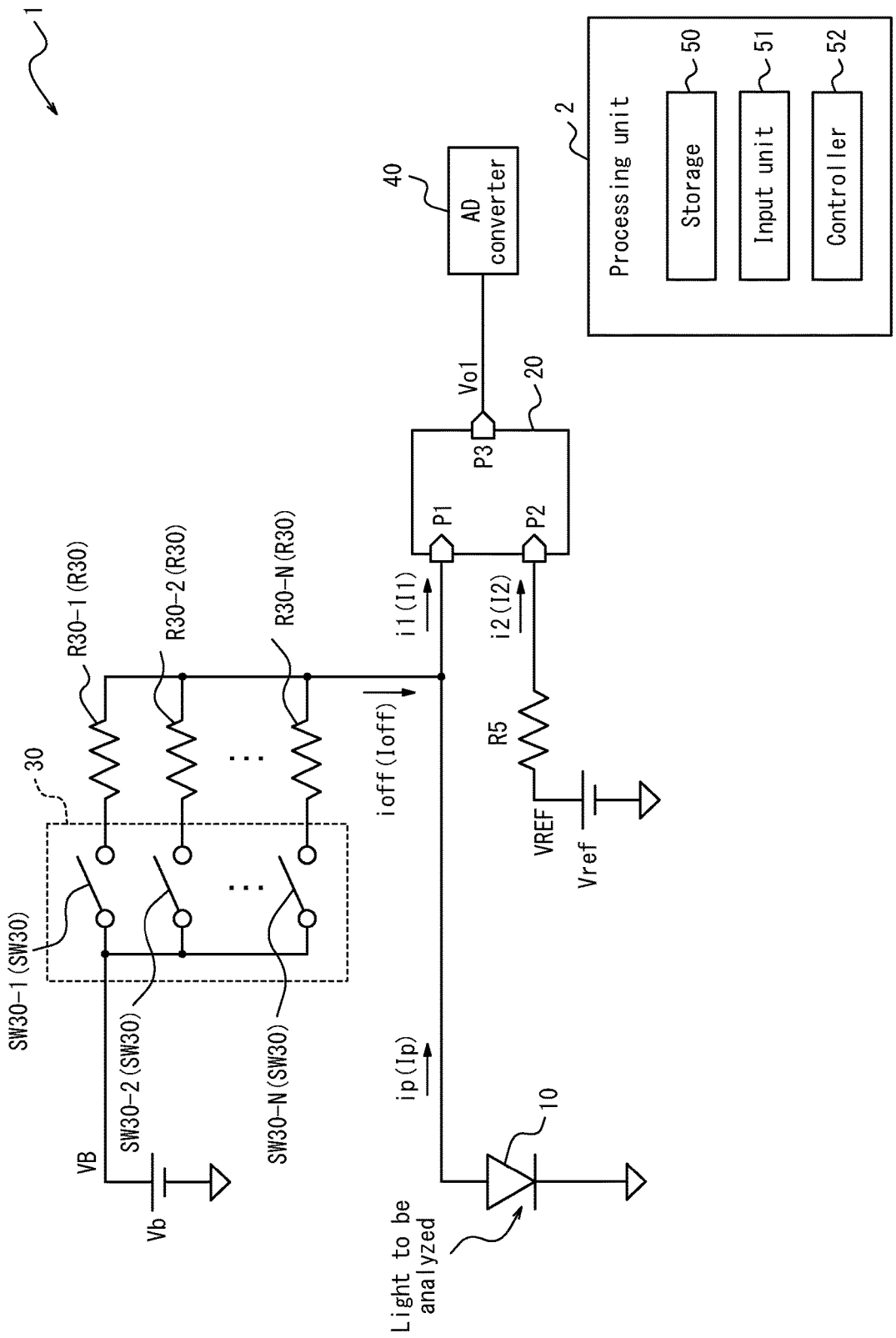
FIG. 1 is a block diagram of an optical measurement apparatus according to a first embodiment of the present disclosure.

In an apparatus for measuring the light intensity of light to be analyzed, an improvement in the performance of detection of the light intensity of the light to be analyzed is desired.

The present disclosure has been conceived of in view of the aforementioned, and it is an aim of the present disclosure to provide an optical measurement apparatus having an improved light intensity detection performance of light to be analyzed.

An optical measurement apparatus according to some embodiments includes: a light receiving element capable of converting a light intensity of light to be analyzed into an electrical signal; an input terminal to which the electrical signal is input; a first amplifier and a nonlinear element configuring a logarithmic amplifier, an inverting input terminal of the first amplifier being electrically connected to the input terminal; a plurality of offset resistors having resistance values different from each other; a switch unit capable of switching an offset resistor to be electrically connected between a voltage source and the input terminal, of the plurality of offset resistors; and a controller, wherein an offset current is input to the input terminal by the offset resistor electrically connected between the voltage source and the input terminal, and the controller measures the light intensity based on an output voltage value of the logarithmic amplifier. Such a configuration can provide a fast measurement of the light intensity of light to be analyzed without any distortions. Accordingly, an optical measurement apparatus which has an improved light intensity detection performance is provided.

In the optical measurement apparatus according to one embodiment, the controller measures a current value of the offset current based on the output voltage value of the logarithmic amplifier when the light receiving element is shaded. Such a configuration enables the optical measurement apparatus to measure the current value of the offset current.

In the optical measurement apparatus according to one embodiment, the controller calculates the light intensity of the light to be analyzed by subtracting a current value of the offset current calculated based on the output voltage value of the logarithmic amplifier when the light receiving element is shaded, from a current value calculated based on the output voltage value of the logarithmic amplifier when the light to be analyzed is incident on the light receiving element. Such a configuration enables the light intensity of light to be analyzed across a wide range.

The optical measurement apparatus according to one embodiment further includes: a second amplifier having a non-inverting input terminal electrically connected to the voltage source; a first switch capable of switching whether or not the light receiving element and the input terminal are electrically connected; a second switch capable of switching whether or not the light receiving element and an inverting input terminal of the second amplifier are electrically connected; a third switch capable of switching whether or not the inverting input terminal of the second amplifier and an output terminal of the second amplifier are electrically connected; and a fourth switch capable of switching whether or not the non-inverting input terminal of the second amplifier is electrically connected to a reference potential, wherein the plurality of offset resistors are provided between the light receiving element and the output terminal of the second amplifier. Such a configuration enables the optical measurement apparatus to use the offset resistors as a feedback resistor of the second amplifier as well as using it for adjusting the current value of the offset current. As a result, there is provided an optical measurement apparatus that configures both a logarithmic amplifier and a linear amplifier while achieving a reduction in costs and reduction in the footprint.

The optical measurement apparatus according the first embodiment has a first mode for measuring the light intensity based on the output voltage value of the logarithmic amplifier and a second mode for measuring the light intensity based on an output voltage value of the second amplifier, in the first mode, the light receiving element and the input terminal are electrically connected by the first switch, the light receiving element and the inverting input terminal of the second amplifier are electrically disconnected by the second switch, the inverting input terminal of the second amplifier and the output terminal of the second amplifier are electrically connected by the third switch, and the non-inverting input terminal of the second amplifier is electrically disconnected from the reference potential by the fourth switch, and in the first mode, the offset current is input to the input terminal via the offset resistor electrically connected between the output terminal of the second amplifier and the input terminal. Such a configuration allows the user to appropriately switch the mode of the optical measurement apparatus between the first mode and the second mode depending on the light to be analyzed, for example.

In the optical measurement apparatus according to one embodiment, the voltage source is a digital-to-analog converter. Such a configuration enables the optical measurement apparatus to input a voltage according to the first mode or the second mode to the non-inverting input terminal of the second amplifier, by the digital-to-analog converter.

In the optical measurement apparatus according to one embodiment, the controller measures the current value of the offset current based on the output voltage value of the second amplifier when the light receiving element is shaded in the first mode. Such a configuration enables the optical measurement apparatus to measure the current value of the offset current.

In the optical measurement apparatus according to one embodiment, the controller: measures the output voltage value of the logarithmic amplifier and the output voltage value of the second amplifier when the light receiving element is shaded for each current value of the offset current while switching the switch unit, and generates a table by associating the measured output voltage value of the logarithmic amplifier with a current value of the offset current calculated based on the measured output voltage value of the second amplifier, and measures the light intensity of the light to be analyzed based on the output voltage value of the logarithmic amplifier when the light to be analyzed is incident on the light receiving element and the table. Such a configuration can provide an accurate measurement of the light intensity of the light to be analyzed in the first mode.

The optical measurement apparatus according to one embodiment further includes a transistor being a depletion type N-channel field effect transistor, wherein the light receiving element is a photodiode, an anode of the photodiode is electrically connected to the first switch and the second switch, and a gate of the transistor is electrically connected to the input terminal, a source of the transistor is electrically connected to a cathode of the photodiode, and a voltage having a positive voltage value is input to a drain of the transistor. Such a configuration can provide an accurate measurement of the light intensity of the light to be analyzed in the first mode.

The optical measurement apparatus according to one embodiment further includes a fifth switch capable of switching whether the cathode of the photodiode is electrically connected to the reference potential or to the source of the transistor, in the second mode, the cathode of the photodiode is electrically connected to the reference potential by the fifth switch. Such a configuration can provide an accurate measurement of the light intensity of the light to be analyzed in the second mode.

According to the present disclosure, there is provided an optical measurement apparatus which has an improved light intensity detection performance.

As used in the present disclosure, the term "linear amplifier" refers to an amplifier including a fixed resistor to be used in the feedback section of the amplifier. The fixed resistor used in the feedback section is also referred to as "feedback resistor". A linear amplifier can be used in a transimpedance circuit.

As used in the present disclosure, the term "logarithmic amplifier" refers to an amplifier including a nonlinear element to be used in the feedback section of the amplifier. The nonlinear element is, for example, a transistor or a diode. The nonlinear element used in the logarithmic amplifier converts a current value which is input to the nonlinear element into a voltage value proportional to the logarithm of the current value. Such a nonlinear element is also referred to as "logarithmic conversion element". A logarithmic amplifier can be used in a transimpedance circuit.

First Embodiment

An optical measurement apparatus 1 is applicable to a wide variety of applications where the light intensity of light to be analyzed is measured. As will be described below, the light measurement apparatus 1 can measure a light intensity across a wide range. The optical measurement apparatus 1 is applicable to an optical spectrum analyzer, an optical power meter, or the like, in which a light intensity needs to be measured across a wide range. For example, an optical spectrum analyzer needs to measure a light intensity in a wide range from +10 dBm to −90 dBm. Hereinafter, the optical measurement apparatus 1 will be described assuming that it is applied to an optical spectrum analyzer.

In an optical spectrum analyzer, light to be analyzed is split by a monochromator such as a diffraction grating. The light to be analyzed which has been split is input to the optical measurement apparatus 1, as illustrated in FIG. 1.

Referring to FIG. 1, the optical measurement apparatus 1 includes a photodiode 10 (light receiving element), a logarithmic amplification circuit 20, a resistor R5, a switch unit 30, offset resistors R30-1 to R30-N, an analog-to-digital (AD) converter 40, and a processing unit 2. The processing unit 2 includes a storage 50, an input unit 51, and a controller 52. However, the light measurement apparatus 1 may include a light receiving element other than the photodiode 10, as long as the light receiving element is capable of converting a light intensity of light to be analyzed into an electrical signal. The logarithmic amplifier circuit 20 has an input terminal P1, an input terminal P2, and an output terminal P3.

Hereinafter, when the offset resistors R30-1 to R30-N are not specifically distinguished from each other, they may also be collectively referred to as "offset resistors R30".

The anode of the photodiode 10 is electrically connected to the input terminal P1 of the logarithmic amplifier circuit 20. The cathode of the photodiode 10 is electrically connected to the reference potential. Light to be analyzed is incident on the photodiode 10. The photodiode 10 converts the light intensity of the light to be analyzed into a photocurrent ip by means of the photovoltaic effect. The photocurrent ip is input to the input terminal P1 of the logarithmic amplifier circuit 20. The current value of the photocurrent ip is also referred to as "photocurrent value Ip".

The photocurrent value Ip is converted into a voltage value by a transimpedance circuit. In the present embodiment, the transimpedance circuit is a logarithmic amplifier as will be described below. The optical measurement apparatus 1 calculates the light intensity of the light to be analyzed based on the output voltage value of this logarithmic amplifier.

Figure 2:
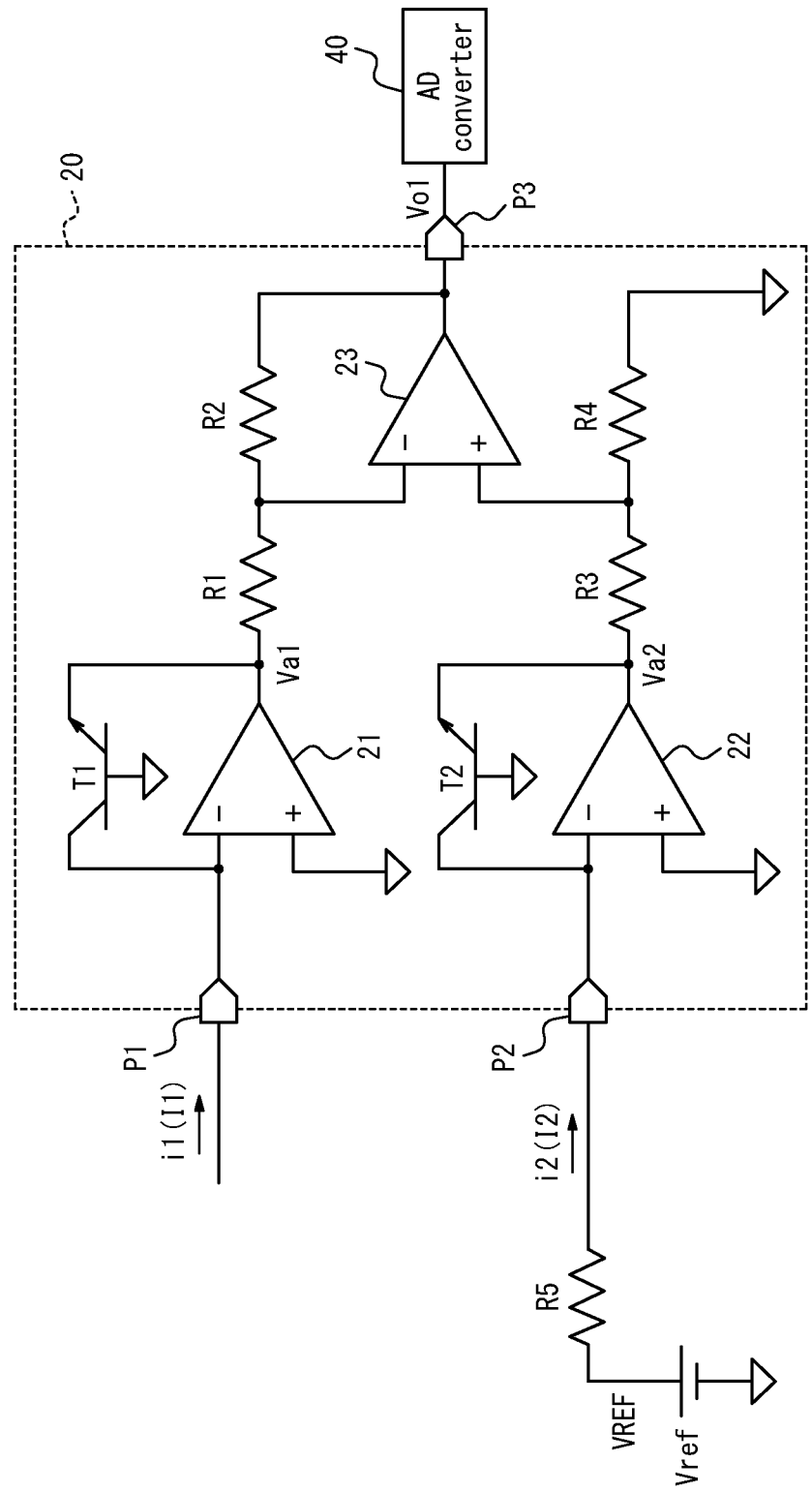
FIG. 2 is a block diagram of a logarithmic amplifier circuit illustrated in FIG. 1.

As illustrated in FIG. 2, the logarithmic amplifier circuit 20 includes an amplifier 21 (first amplifier), an amplifier 22, an amplifier 23, a transistor T1, a transistor T2, a resistor R1, a resistor R2, a resistor R3, and a resistor R4. The transistor T1 and the transistor T2 are, for example, bipolar transistors.

The amplifier 21 and the transistor T1 configure a logarithmic amplifier. For example, the emitter of the transistor T1 is electrically connected to the output terminal of the amplifier 21, and the collector of the transistor T1 is electrically connected to the inverting input terminal of the amplifier 21. Further, the transistor T1 is configured as a base-grounded bipolar transistor. For example, the base of the transistor T1 is electrically connected to the reference potential. Further, the amplifier 21 is configured so that the inverting input terminal and the non-inverting input terminal are virtually short-circuited. For example, the non-inverting input terminal of the amplifier 21 is electrically connected to the reference potential.

The inverting input terminal of the amplifier 21 is electrically connected to the input terminal P1 of the logarithmic amplifier circuit 20. The current that is input to the input terminal P1 is also referred to as "current i1". Further, the current value of the current i1 is also referred to as "current value I1".

The relationship between the current value I1 and the output voltage value Va1 of the amplifier 21 is expressed by the equation (1) due to the characteristics of the bipolar transistor.

$$Va1 = -kT/q \times \ln(I1/Is) \qquad \text{Equation (1)}$$

In the equation (1), the constant k is Boltzmann's constant. The constant k is, for example, $1.38 \times 10^{-23}$ J/K. The temperature T is the absolute temperature of the transistor T1. The charge amount q is the amount of charge per electron. The charge amount q is, for example, $1.602 \times 10^{-19}$ C. The current value Is is the current value of the reverse direction saturation current of the transistor T1.

In the present embodiment, the amplifier 22, the amplifier 23, the transistor T2, the voltage source Vref, and the resistor R5 are used to cancel out the current value Is in the equation (1), as will be described below.

The amplifier 22 is a replica circuit of the amplifier 21. The amplifier 22 has the same electrical characteristics as the amplifier 21. The transistor T2 is a replica circuit of the transistor T1. The transistor T2 has the same electrical characteristics as the transistor T1. The transistor T2 is in a thermal contact with the transistor T1. The transistor T2 operates at the same temperature as the transistor T1.

The amplifier 22 and the transistor T2 configure a logarithmic amplifier. For example, the emitter of the transistor T2 is electrically connected to the output terminal of the amplifier 22, and the collector of the transistor T2 is electrically connected to the inverting input terminal of the amplifier 22. Further, the transistor T2 is configured as a base-grounded bipolar transistor. For example, the base of the transistor T2 is electrically connected to the reference potential. Further, the amplifier 22 is configured so that the inverting input terminal and the non-inverting input terminal are virtually short-circuited. For example, the non-inverting input terminal of the amplifier 22 is electrically connected to the reference potential.

The inverting input terminal of the amplifier 22 is electrically connected to the input terminal P2 of the logarithmic amplifier circuit 20. The voltage from the voltage source Vref is input to the input terminal P2 via the resistor R5. The current i2 is input to the input terminal P2. The current value of the current i2 is also referred to as "current value I2".

The current value I2 is set by the voltage value VREF of the voltage source Vref and the resistor R5. This makes the current value I2 known. The resistor R5 is configured to include a fixed resistor. The resistor R5 has two terminals. One terminal of the resistor R5 is electrically connected to the input terminal P2. The other terminal of the resistor R5 is electrically connected to the voltage source Vref.

The relationship between the current value I2 and the output voltage value Va2 of the amplifier 22 is expressed by the equation (2) similarly to the equation (1) described above.

$$Va2 = -kT/q \times \ln(I2/Is) \qquad \text{Equation (2)}$$

The inverting input terminal of the amplifier 23 is electrically connected to the output terminal of the amplifier 21 via the resistor R1. The inverting input terminal of the amplifier 23 is electrically connected to the output terminal of the amplifier 23 via the resistor R2. Further, the output terminal of the amplifier 22 is electrically connected to the non-inverting input terminal of the amplifier 23 via the resistor R3. The non-inverting input terminal of the amplifier 23 is electrically connected to the reference potential via the resistor R4.

The resistor R1 and the resistor R3 are each configured to have a temperature measuring resistor having a positive temperature coefficient. The resistor R2 and the resistor R4 are each configured to have a fixed resistor.

Each of the resistor R1 and the resistor R2 has two terminals. One terminal of the resistor R1 is electrically connected to the output terminal of the amplifier 21. The other terminal of the resistor R1 is connected to one terminal of the resistor R2 and to the inverting input terminal of the amplifier 23. The other terminal of the resistor R2 is connected to the output terminal of the amplifier 23. Each of the resistor R3 and the resistor R4 has two terminals. One terminal of the resistor R3 is electrically connected to the output terminal of the amplifier 22. The other terminal of the resistor R3 is electrically connected to one terminal of the resistor R4 and to the non-inverting input terminal of the amplifier 23. The other terminal of the resistor R4 is electrically connected to the reference potential.

As will be described below, the light intensity of the light to be analyzed is calculated based on the output voltage value of the logarithmic amplifier circuit 20. The output voltage value of the amplifier 23, i.e., the output voltage value Vo1 of the logarithmic amplifier circuit 20, is expressed by the equation (3).

$$Vo1 = G \times (Va2 - Va1) = GkT/q \times \ln(I1/I2) \quad \text{Equation (3)}$$

In the equation (3), G=r2/r1=r4/r3. The resistance value r1 is the resistance value of the resistor R1. The resistance value r2 is the resistance value of the resistor R2. The resistance value r3 is the resistance value of the resistor R3. The resistance value r4 is the resistance value of the resistor R4.

The equation (3) indicates that the output voltage value Vo1 has a temperature dependence. For example, the output voltage value Vo1 is proportional to the temperature T. By using temperature measuring resistors having a positive temperature coefficient as the resistors R1 and R3 of the resistors R1 to R4, the temperature dependence of the output voltage value Vo1 is reduced.

Here, when the photodiode 10 is shaded, the photocurrent value Ip becomes 0 A or less. When the photocurrent value Ip falls to 0 A and the current value I1 thus falls to 0 A or less, only a very small current flows from the emitter to the collector of the transistor T1. As a result, the output voltage value Va1 of the amplifier 21 saturates to a positive voltage value. In other words, the output voltage value Va1 of the amplifier 21 saturates to the positive voltage value, resulting in latch-up of the amplifier 21. For preventing latch-up of the amplifier 21, an offset current ioff is input to the input terminal P1 via a switch unit 30 and an offset resistor R30 in the present embodiment. The current value of an offset current ioff is also referred to as "offset current value Ioff". In this configuration, the current value I1 is the sum of the offset current value Ioff and the photocurrent value Ip. Using the sum of the offset current value Ioff and the photocurrent value Ip as the current value I1 prevents the current value I1 from falling to 0 A or less, which prevents latch-up of the amplifier 21.

Each offset resistor R30 has two terminals. Each offset resistors R30 is configured to include a fixed resistor. The offset resistors R30-1 to R30-N have resistance values that are different from each other. For example, the resistance values of the offset resistors R30 increase by a factor of 10 from the offset resistor R30-1 to the offset resistor R30-N.

The switch unit 30 is capable of switching an offset resistor R30 to be electrically connected between the voltage source Vb and the input terminal P1, of the offset resistors R30-1 to R30-N. The switch unit 30 includes changeover switches SW30-1 to SW30-N.

Hereinafter, when the changeover switches SW30-1 to SW30-N are not specifically distinguished from each other, they are also referred to as "changeover switches SW30".

Each changeover switch SW30 has two terminals. Each changeover switch SW 30 is configured to include a mechanical relay, a photoMOS relay, an analog switch, or the like. Alternatively, the switch unit 30 may be configured as an analog multiplexer. In the case where the switch unit 30 is configured as an analog multiplexer, either terminals of the changeover switches SW30-1 to SW30-N can be unified.

Hereinafter, the offset resistor R30 corresponding to a changeover switch SW30-$i$ (i is an integer from 1 to N) is also referred to as "offset resistor R30-$i$".

One terminal of the changeover switch SW30-$i$ is electrically connected to the voltage source Vb. The other terminal of the changeover switch SW30-$i$ is electrically connected to one terminal of the offset resistor R30-$i$. The other terminal of the offset resistor R30-$i$ is electrically connected to the input terminal P1. Alternatively, one terminal of the offset resistor R30-$i$ may be electrically connected to the voltage source Vb, and the other terminal of the offset resistor R30-$i$ may be connected to one terminal of the changeover switch SW30-$i$. In such a case, the other terminal of the changeover switch SW30-$i$ is electrically connected to the input terminal P1.

A control signal from the controller 52 is output to a changeover switch SW 30. The changeover switch SW30 is turned on (changes to the conductive state) or turned off (changes to the non-conductive state) according to the control signal from the controller 52. When the changeover switch SW30-$i$ is turned on, the offset resistor R30-$i$ is electrically connected between the voltage source Vb and the input terminal P1. Or, when the changeover switch SW30-$i$ is turned off, the offset resistor R30-$i$ is electrically disconnected from the voltage source Vb and the input terminal P1.

The AD converter 40 is an analog-to-digital converter. The AD converter 40 is electrically connected to the output terminal of the amplifier 23. The output voltage value Vo1 of the logarithmic amplifier circuit 20 is input to the AD converter 40. The AD converter 40 converts the output voltage value Vo1 in the form of an analog signal into a digital signal. The AD converter 40 outputs the digital signal to the controller 52.

The storage 50 is, for example, a semiconductor memory, a magnetic memory, an optical memory, or the like. The storage 50, however, is not limited to these. The storage 50 may function as, for example, a main storage device, an auxiliary storage device, or a cache memory. The storage 50 stores certain information used for operations of the optical measurement apparatus 1. For example, the storage 50 may store various types of information and the like, such as a system program and an application program.

The input unit 51 includes an input interface for receiving an input from a user. The input interface can be physical keys, capacitive keys, a touch screen, or a microphone for receiving voice inputs. The input interface, however, is not limited to these.

The controller 52 includes at least one processor, at least one dedicated circuit, or a combination thereof. The processor is, for example, a general-purpose processor such as a central processing unit (CPU) or a graphics processing unit (GPU), or a dedicated processor adapted to particular processing. The dedicated circuit is, for example, a field-programmable gate array (FPGA) or an application specific integrated circuit (ASIC). The controller 52 executes processing pertaining to operations of the optical measurement apparatus 1 while controlling the components of the optical measurement apparatus 1.

<Measurement Sensitivity Setting Processing>

Before carrying out an analysis of an optical spectrum, for example, the controller 52 receives an input of the measurement sensitivity to be described below via the input unit 51. This input is provided by a user via the input unit 51.

The measurement sensitivity is a metric of an allowable noise level upon measuring the light intensity of light to be analyzed. The measurement sensitivity is defined by the sensitivity of the optical measurement apparatus 1, for example. As the sensitivity of the optical measurement apparatus 1 increases, the noise level decreases. As an example, as exemplified in FIG. 3, the measurement sensitivities of the sensitivities A, B, C, and D are set. The noise level decreases when the sensitivity changes in the order of the sensitivities A, B, C, and D. The noise levels of the optical measurement apparatus 1 corresponding to the sensitivities A, B, C, and D are −50 dBm, −60 dBm, −70 dBm and −80 dBm, respectively.

As the feedback resistance value of the feedback section of the amplifier 21, i.e., the resistance value Rt of the transistor T1, increases, the sensitivity of the output voltage value Vo1 of the logarithmic amplifier circuit 20 to the current value I1 increases. In other words, as the resistance value Rt of the transistor T1 increases, the sensitivity of the logarithmic amplifier circuit 20 increases and the noise level of the optical measurement apparatus 1 decreases. However, as the resistance value Rt of the transistor T1 increases, the response speed of the amplifier 21 decreases and the measurement speed of the optical measurement apparatus 1 decreases accordingly. In other words, as the resistance value Rt of the transistor T1 increases, the noise level of the optical measurement apparatus 1 decreases but the measurement speed of the optical measurement apparatus 1 decreases. For example, the noise level decreases when the sensitivity decreases when the sensitivity changes in the order of the sensitivities A, B, C, and D. However, the measurement speed decreases by a factor of 10 when the sensitivity changes in the order of the sensitivities A, B, C, and D.

Here, the resistance value Rt of the transistor T1 is expressed by the equation (4). The equation (4) is derived by differentiating the equation (1). Further, the cutoff frequency fc of the amplifier 21 is expressed by the equation (5).

$$Rt = kT/(q \times I1) \qquad \text{Equation (4)}$$

$$fc = 1/(2\pi \times Rt \times Cj) = (q \times I1)/(2\pi \times kT \times Cj) \qquad \text{Equation (5)}$$

In the equation (5), the capacitance value Cj is the junction capacitance value of the transistor T1. For example, in the case where the capacitance value Cj is 1 pF and the current value I1 is 100 pA, the cutoff frequency fc is 600 Hz. Or, in the case where the capacitance value Cj is 1 pF and the current value I1 is 1 nA, the cutoff frequency fc is 6 kHz.

The equation (4) indicates that the resistance value Rt increases as the current value I1 decreases. As described above, as the resistance value Rt of the transistor T1 increases, the measurement sensitivity of the optical measurement apparatus 1 increases but the measurement speed of the optical measurement apparatus 1 decreases. As a result, as the current value I1 decreases, the resistance value Rt increases and the measurement sensitivity of the optical measurement apparatus 1 increases but the measurement speed of the optical measurement apparatus 1 decreases. Further, the equation (5) indicates that the cutoff frequency fc is proportional to the current value I1. In other words, the cutoff frequency fc increases in proportion to the current value I1 up to an amplification band of the amplifier 21 of about several megahertz (MHz). Accordingly, as the current value I1 increases, the cutoff frequency fc increases and the frequency band of the amplifier 21 widens.

In the present embodiment, as described above, the current value I1 is the sum of the offset current value Ioff and the photocurrent value Ip. In the present embodiment, the offset current value Ioff can be adjusted by switching an offset resistor R30 to be electrically connected between the voltage source Vb and the input terminal P1 by the switch unit 30. In other words, in the present embodiment, the measurement sensitivity of the optical measurement apparatus 1, the measurement speed of the optical measurement apparatus 1, and the frequency band of the amplifier 21 can be adjusted through an adjustment of the offset current value Ioff to thereby adjust the current value I1.

For example, when the light intensity of light to be analyzed is low, an offset resistor R30 having a large resistance value is caused to be electrically connected between the voltage source Vb and the input terminal P1 by the switch unit 30. Such a configuration reduces the offset current value Ioff to thereby reduce the current value I1, leading to an increased measurement sensitivity of the optical measurement apparatus 1.

For example, when the light intensity of light to be analyzed is high, an offset resistor R30 having a small resistance value is caused to be electrically connected between the voltage source Vb and the input terminal P1 by the switch unit 30. Such a configuration increases the offset current value Ioff to thereby increase the current value I1, leading to an increased measurement speed of the optical measurement apparatus 1.

The sensitivities A, B, C and D as exemplified in FIG. 3 are set by setting the offset current value Ioff to 200 nA, 20 nA, 2 nA, and 200 pA, respectively. In this case, the cutoff frequencies fc for the sensitivities A, B, C, and D are set to 1 MHz, 100 kHz, 10 kHz, and 1 kHz, respectively. In FIG. 3, the resistance value Rs30 is the resistance value of an offset resistor R30 which is electrically connected between the input terminal P1 and the voltage source Vb by the switch unit 30. When the voltage value VB of the voltage source Vb is 0.2 V, the measurement sensitivities are set to the sensitivities A, B, C, and D by setting the resistance values Rs30 to 1 MΩ, 10 MΩ, 100 MΩ, and 1 GΩ, respectively.

Hereinafter, the resistance values of the offset resistors R30-1, R30-2, R30-3, and R30-4 are assumed to be 1 MΩ, 10 MΩ, 100 MΩ, and 1 GΩ, respectively. When one of the offset resistors R30-1 to R30-4 is electrically connected between the input terminal P1 and the voltage source Vb by the switch unit 30, the measurement sensitivity of the optical measurement apparatus 1 is set to the corresponding one of the sensitivities A to D. In other words, one of the sensitivities A to D is set by turning on the corresponding one of the changeover switch SW30-1 to SW30-4 and turning off the changeover switches SW30 other than that one of the changeover switches SW30-1 to SW30-4.

The measurement sensitivity and switching information for the switch unit 30 for setting to that measurement sensitivity are stored in the storage 50, while being associated with each other. The switching information for the switch unit 30 includes information of the changeover switch SW 30 to be turned on and information of the changeover switches SW 30 to be turned off. For example, in the case where the measurement sensitivity is the sensitivity A as exemplified in FIG. 3, the switching information for the switch unit includes information of the changeover switch SW30-1 to be turned on and information of the changeover switches SW30 to be turned off other than SW30-1.

<Offset Current Value Measurement Processing>

The controller 52 can measure the offset current value Ioff by measuring the output voltage value Vo1 of the logarithmic amplifier circuit 20 by the AD converter 40 when the photodiode 10 is shaded. In other words, the controller 52 can calculate the offset current value Ioff based on the output voltage value Vo1. The offset current value Ioff is used for a calculation of the light intensity of light to be analyzed, as will be described below. The actual offset current value Ioff may deviate from the offset current value Ioff as exemplified in FIG. 3 due to manufacturing errors of the optical measurement apparatus 1. By measuring the offset current value Ioff, the light intensity of light to be analyzed can be measured more accurately.

The controller 52 calculates the offset current value Ioff1 based on the output voltage value Vo1 and the equation (6). The offset current value Ioff1 is a current value that is calculated from the output voltage value Vo1 as the offset current value.

$$Ioff1 = I2 \times \exp(Vo1/K) \qquad \text{Equation (6)}$$

In the equation (6), K=GkT/q.

The equation (6) indicates that the offset current value Ioff1 calculated based on the output voltage value Vo1 is dependent on the temperature T. More specifically, even when the same offset resistor R30 is connected between the voltage source Vb and the input terminal P1, the offset current value Ioff1 varies if the temperature T upon an optical measurement by the optical measurement apparatus 1 varies.

To address this issue, the controller 52 measures the offset current value Ioff1 before carrying out light intensity measurement processing or periodically, for example. The controller 52 may measure an offset current value Ioff1 for each offset resistor R30, i.e., for each measurement sensitivity. In this case, the controller 52 measures output voltage value Vo1 of the logarithmic amplifier circuit 20 when the photodiode 10 is shaded while switching among the offset resistors R30 to be electrically connected between the voltage source Vb and the input terminal P1 by the switch unit 30. The controller 52 calculates the offset current value Ioff1 for each offset resistor R30 based on the output voltage value Vo1 and the equation (6). The controller 52 stores the offset current value Ioff1 associated with the offset resistance R30, i.e., the measurement sensitivity, in the storage 50.

<Light Intensity Measurement Processing>

The controller 52 measures the output voltage value Vo1 of the logarithmic amplifier circuit 20 by the AD converter 40 when light to be analyzed is incident on the photodiode 10. The controller 52 calculates the current value I1 based on the measured output voltage value Vo1 and the equation (7). Note that the equation (7) is derived from the equation (3). Further, the current value I2 in the equation (7) is known as described above. The controller 52 obtains the offset current value Ioff1 associated with the measurement sensitivity from the storage 50. The controller 52 calculates the photocurrent value Ip by subtracting the obtained offset current value Ioff1 from the current value I1 according to the equation (8). The controller 52 calculates the light intensity Pin based on the photocurrent value Ip and the equation (9).

$$I1 = I2 \times \exp(Vo1/K) \qquad \text{Equation (7)}$$

$$Ip = I1 - Ioff1 \qquad \text{Equation (8)}$$

$$Pin = Ip/S \qquad \text{Equation (9)}$$

In the equation (7), K=GkT/q. Further, in the equation (9), the photosensitivity S is the photosensitivity of the photodiode 10.

Figure 4:
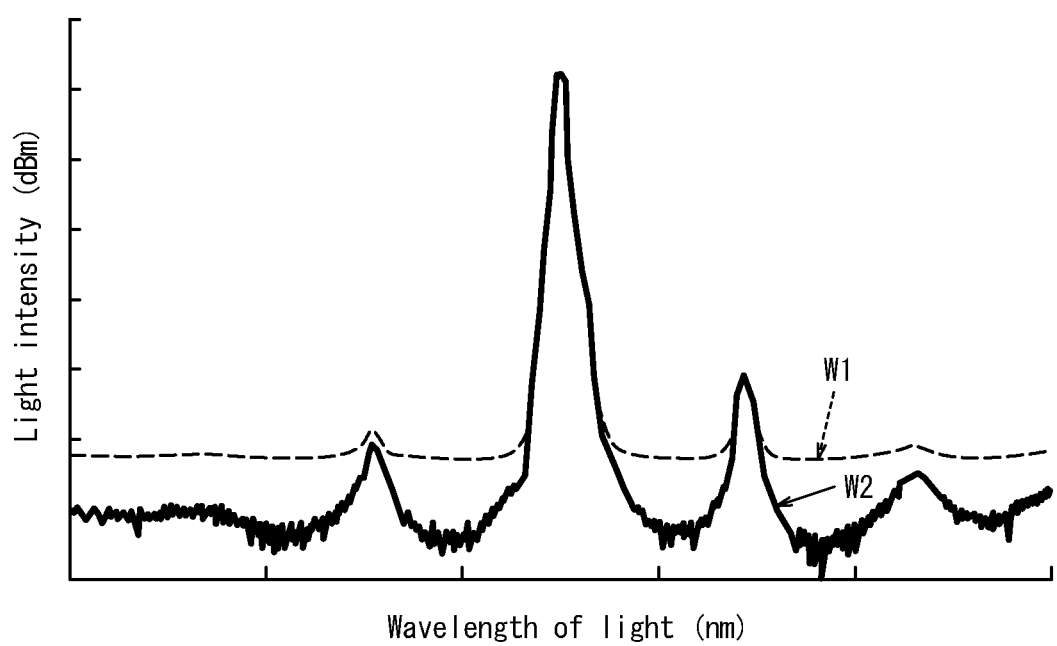
FIG. 4 is a diagram illustrating waveforms of optical spectra.

FIG. 4 is a diagram illustrating waveforms of optical spectra. In FIG. 4, the horizontal axis represents the wavelength of light (nm). The vertical axis represents the light intensity (dBm). An optical spectrum analyzer analyzes an optical spectrum by continuously measuring the light intensity across light wavelengths. In other words, when the optical measurement apparatus 1 is applied to an optical spectrum analyzer, the light intensity is measured while light wavelengths are swept in the optical measurement apparatus 1.

The waveform W1 indicates the light intensity calculated from the equation (9) assuming Ip=I1 without subtracting the offset current value Ioff1 from the current value I1 according to the equation (8). The waveform W2 is obtained based on the photocurrent value Ip and the equation (9), wherein the photocurrent value Ip is calculated by subtracting the offset current value Ioff1 from the current value I1 according to the equation (8).

As described above, in the optical measurement apparatus 1, the controller 52 calculates the photocurrent value Ip by subtracting the offset current value Ioff1 from the current value I1 according to the equation (8). Such a configuration enables the light intensity of light to be analyzed across a wide range.

<Operation of Optical Measurement System>

Figure 5:
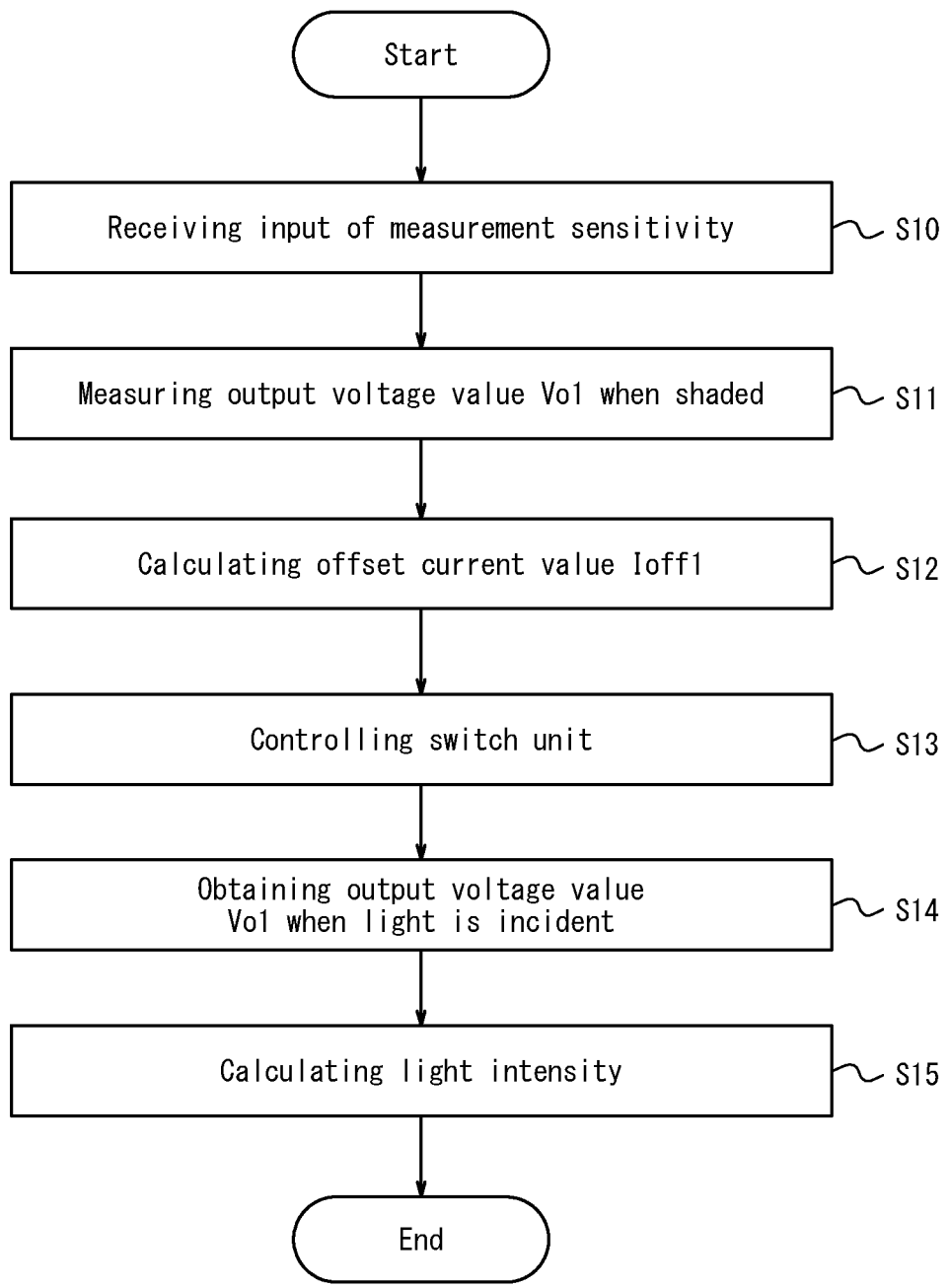
FIG. 5 is a flowchart illustrating an example of an optical measurement method by the optical measurement apparatus illustrated in FIG. 1.

FIG. 5 is a flowchart illustrating an example of an optical measurement method by the optical measurement apparatus 1 illustrated in FIG. 1. The optical measurement method may be implemented as an optical measurement program which is executed by a processor such as the controller 52. The optical measurement program may be stored on a non-transitory computer-readable medium. In response to the controller 52 detecting an input of a measurement sensitivity by the input unit 51, the controller 52 starts the processing of Step S10 as illustrated in FIG. 5.

In the processing of Step S10, the controller 52 receives the input of the measurement sensitivity via the input unit 51. The user enters one of the sensitivities A to D as exemplified in FIG. 3 according to the light intensity of light to be analyzed, via the input unit 51. For example, when the light intensity of light to be analyzed is low, the user enters the sensitivity D via the input unit 51. Or, when the light intensity of light to be analyzed is high and the user wishes to increase the measurement speed, the user enters the sensitivity A via the input unit 51.

Before the processing of Step S11 is carried out, the photodiode 10 is shaded. In the processing of Step S11, the controller 52 measures output voltage values Vo1 of the logarithmic amplifier circuit 20 when the photodiode 10 is shaded while switching among the offset resistors R30 to be electrically connected between the voltage source Vb and the input terminal P1 by the switch unit 30.

In the processing of Step S12, the controller 52 calculates the offset current value Ioff1 for each offset resistor R30 based on the output voltage value Vo1 and the equation (6). The controller 52 stores the offset current value Ioff1 associated with the offset resistance R30, i.e., the measurement sensitivity, in the storage 50.

In the processing of Step S13, the controller 52 obtains, from the storage 50, the switching information for the switch unit 30 for setting to the measurement sensitivity received in the processing of Step S10. The controller 52 controls the switch unit 30 based on the obtained switching information for the switch unit 30. For example, in the case where the measurement sensitivity received in the processing of Step S10 is sensitivity A as exemplified in FIG. 3, the controller 52 turns on the changeover switch SW30-1 and turns off the changeover switches SW30 other than the changeover switch SW30-1.

Before the processing of Step S14 is carried out, the photodiode 10 is set such that light to be analyzed can pass through the photodiode 10. In the processing of Step S14, light to be analyzed is input to the photodiode 10. In the processing of Step S14, the controller 52 measures, by the AD converter 40, the output voltage value Vo1 of the logarithmic amplifier circuit 20 when the light to be analyzed is incident on the photodiode 10.

In the processing of Step S15, the controller 52 obtains, from the storage 50, the offset current value Ioff1 associated with the measurement sensitivity received in the processing of Step S10. In the processing of Step S15, the controller 52 calculates the light intensity of the light to be analyzed based on the output voltage value Vo1 measured in the processing of Step S14, the offset current value Ioff1 obtained from the storage 50, and the equations (7) to (9).

Note that the controller 52 may not carry out the processing of Steps S11 and S12 if the processing of Steps S11 and S12 has been carried out in advance, for example.

Further, the controller 52 may periodically carry out the processing of Steps S11 and S12 at any timing. In such a case, the user may manually shade the photodiode 10 when the processing of Step S11 is carried out. Alternatively, the optical measurement apparatus 1 may be configured so that the photodiode 10 is automatically shaded when the processing of Step S11 is carried out.

The effects of the optical measurement apparatus 1 according to the present embodiment will be described by making comparisons against an optical measurement apparatus 301 according to a first comparative example and an optical measurement apparatus 401 according to a second comparative example.

FIRST COMPARATIVE EXAMPLE

Figure 6:
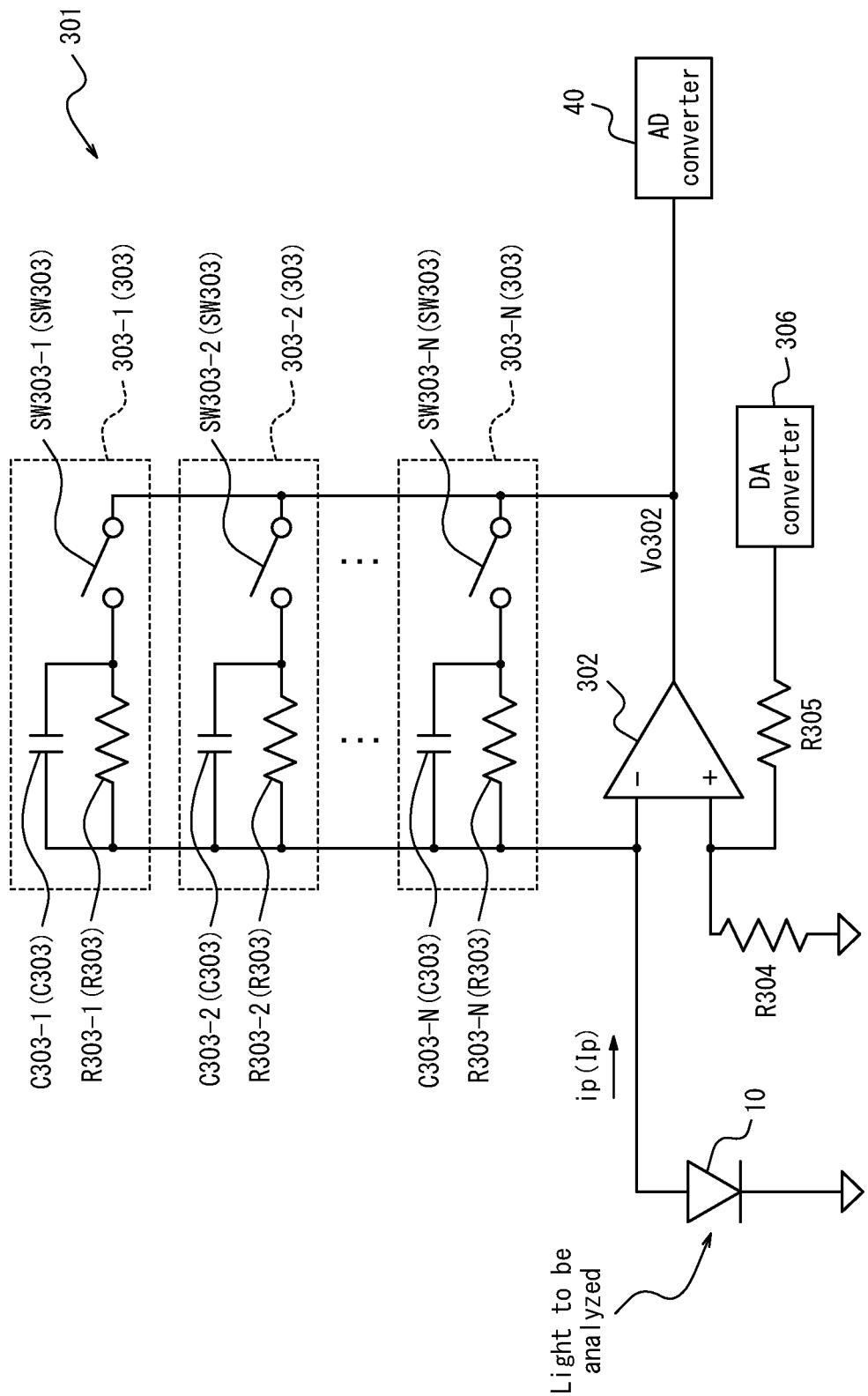
FIG. 6 illustrates an optical measurement apparatus provided with a linear amplifier according to a first comparative example.

FIG. 6 illustrates an optical measurement apparatus 301 including a linear amplifier according to a first comparative example. An optical measurement apparatus 301 includes a photodiode 10, an AD converter 40, an amplifier 302, feedback sections 303-1 to 303-N, a resistor R304, a resistor R305, and a digital-to-analog (DA) converter 306. The resistors R304 and R305 are used similarly to the resistors R6 and R7 as illustrated in FIG. 10 which will be described below. Further, the DA converter 306 is used similarly to the DA converter 70 as illustrated in FIG. 10 which will be described below.

The anode of the photodiode 10 is electrically connected to the inverting input terminal of the amplifier 302. In response to light to be analyzed being incident on the photodiode 10, a photocurrent ip flows from the photodiode 10 toward the inverting input terminal of the amplifier 302.

The amplifier 302 and the feedback sections 303-1 to 303-N configure a linear amplifier. For example, the feedback sections 303-1 to 303-N are electrically connected between the output terminal of the amplifier 302 and the inverting input terminal of the amplifier 302.

The feedback sections 303-1 to 303-N are electrically connected in parallel. The feedback sections 303-1 to 303-N include capacitors C303-1 to C303-N, resistors R303-1 to R303-N, and switches SW303-1 to SW303-N, respectively.

Hereinafter, when the feedback sections 303-1 to 303-N are not specifically distinguished from each other, they may also be collectively referred to as "feedback sections 303". Further, when the capacitors C303-1 to C303-N are not specifically distinguished from each other, they may also be collectively referred to as "capacitors C303". Further, when the resistors R303-1 to R303-N are not specifically distinguished from each other, they may also be collectively referred to as "resistors R303". Further, when the switches SW303-1 to SW303-N are not specifically distinguished from each other, they may also be collectively referred to as "switches SW303".

Each capacitor C303 has two terminals. Each resistor R303 has two terminals. Each switch SW303 has two terminals.

Hereinafter, the capacitor C303, the resistor R303, and the switch SW303 included in the feedback section 303-i (i is an integer from 1 to N) are also referred to as "capacitor C303-i", "resistor R303-i", and "switch SW 303-i", respectively.

One terminal of the capacitor C303-i is electrically connected to one terminal of the resistor R303-i. The other terminal of the capacitor C303-i is electrically connected to the other terminal of the resistor R303-i. One terminal of the resistor R303-i is electrically connected to the inverting input terminal of the amplifier 302. The other terminal of the resistor R303-i is electrically connected to one terminal of the switch SW303-i. The other terminal of the switch SW303-i is electrically connected to the output of the amplifier 302.

In the first comparative example, the AD converter 40 is electrically connected to the output terminal of the amplifier 302. The output voltage value Vo302 of the amplifier 302 is input to the AD converter 40. In the first comparative example, the light intensity of light to be analyzed is measured based on the output voltage value Vo302 of the amplifier 302.

In the optical measurement apparatus 301 according to the first comparative example, the measurement sensitivity is set by the resistance value of a resistor R303, i.e., a feedback resistor, connected between the output terminal of the amplifier 302 and the inverting input terminal. As the resistance value of the feedback resistor increases, the sensitivity of the optical measurement apparatus 301 increases and the noise level of the optical measurement apparatus 301 decreases. For example, as exemplified in FIG. 7, the measurement sensitivity of the optical measurement apparatus 301 is set to one of a high sensitivity, a medium sensitivity, and a low sensitivity. The resistance value of the feedback resistor increases and the noise level of the optical measurement apparatus 301 decreases when the sensitivity changes in the order of the low sensitivity, the medium sensitivity, and the high sensitivity. However, as the resistance value of the feedback resistor increases, the response speed of the amplifier 302 decreases and the measurement speed of the optical measurement apparatus 301 decreases accordingly. In other words, when the resistance value of the feedback resistor increases, the noise level of the optical measurement apparatus 301 decreases but the measurement speed of the optical measurement apparatus 301 decreases. For example, as exemplified in FIG. 7, the measurement speed of the optical measurement apparatus 301 decreases from fast to moderate, then to slow when the sensitivity changes in the order of the low sensitivity, the medium sensitivity, and the high sensitivity.

In the first comparative example, the cutoff frequency fc of the amplifier 302 is represented by the equation (10).

$$fc = 1/(2\pi \times Rf303 \times Cf303) \qquad \text{Equation (10)}$$

In the equation (10), the feedback capacitance value Cf303 is a capacitance value of the capacitor C303, i.e., the feedback capacitance, electrically connected between the output terminal of the amplifier 302 and the inverting input terminal. Further, the feedback resistance value Rf303 is the resistance value of a resistor R303, i.e., the feedback resistor, electrically connected between the output terminal of the amplifier 302 and the inverting input terminal. For example, in the case where the feedback capacitance value Cf303 is 1 pF and the feedback resistance value Rf303 is 100 MΩ, the cutoff frequency becomes 1.6 kHz.

The equation (10) indicates that the cutoff frequency fc increases and the frequency band of the amplifier 302 widens as the feedback resistance value Rf303 decreases. Further, as described above, as the feedback resistance value Rf303 decreases, the measurement sensitivity of the optical measurement apparatus 301 decreases. In other words, as the feedback resistance value Rf303 decreases, the measurement sensitivity of the optical measurement apparatus 301 decreases but the frequency band of the amplifier 302 widens. For example, as exemplified in FIG. 7, the cutoff frequency widens from the low band to the medium band, then to the high band, when the sensitivity changes in the order of the high sensitivity, the medium sensitivity, and the low sensitivity.

Note that the equation (10) indicates that the cutoff frequency fc increases and the frequency band of the amplifier 302 widens as the feedback capacitance value Cf303 decreases. However, as the feedback capacitance value Cf303 decreases, the high-frequency noises of the amplifier 302 increase. As a result, the feedback capacitance value Cf303 is limited to a certain value, and the cutoff frequency fc and the like are adjusted by the feedback resistance value Rf303.

Here, in the optical measurement apparatus 301 of the first comparative example, measurable light intensities of light to be analyzed are limited by the power supply voltage of the linear amplifier configured from the amplifier 302 and the feedback section 303. In the first comparative example, because measurable light intensities of light to be analyzed are limited by the power supply voltage of the linear amplifier, the feedback resistance value Rf303 needs to be decreased when light to be analyzed has a high light intensity. Further, in the first comparative example, when light to be analyzed has a low light intensity, the feedback resistance value Rf303 needs to be increased for increasing the measurement sensitivity of the optical measurement apparatus 301. In other words, for applying the optical measurement apparatus 301 to an optical spectrum analyzer, the feedback resistance value Rf303 needs to be decreased when light to be analyzed has a high light intensity, whereas the feedback resistance value Rf303 needs be increased when light to be analyzed has a low light intensity, in the optical measurement apparatus 301. Due to the configuration thereof, in the first comparative example, the switches SW303 need to be switched for connecting an appropriate resistor R303 between the output terminal of the amplifier 302 and the inverting input terminal according to the light intensity of light to be analyzed. Accordingly, in the first comparative example, operation of switching the switches SW303 according to the light intensity of light to be analyzed is required while the light wavelengths are swept during an analysis of an optical spectrum. Because switching operations of the SW303 are required in the first comparative example, the time to analyze an optical spectrum increases. Further, in the optical measurement apparatus 301, an analysis of the optical spectrum needs to be suspended until the output voltage value Vo302 of the amplifier 302 stabilizes after the switches SW303 are switched. In the optical measurement apparatus 301, because an analysis of an optical spectrum is suspended until the output voltage value Vo302 of the amplifier 302 stabilizes, the time to analyze an optical spectrum is increased.

In contrast to the first comparative example, in the optical measurement apparatus 1 according to the present embodiment, the output voltage value Vo1 is the logarithm of the photocurrent value Ip, as indicated by the equations (7) and (8). Because the output voltage value Vo1 is the logarithm of the photocurrent value Ip, measurable light intensities of light to be analyzed are not limited by the power supply voltage of the logarithmic amplifier circuit 20 in the optical measurement apparatus 1. Unlike the first comparative example, this configuration eliminates switching operations of the switches SW303 during an analysis of an optical spectrum in the optical measurement apparatus 1. Further, unlike the first comparative example, suspension of an analysis of an optical spectrum until the output voltage value Vo302 of the amplifier 302 stabilizes is not required in the optical measurement apparatus 1. Accordingly, in the optical measurement apparatus 1 according to the present embodiment, the time to analyze an optical spectrum is reduced as compared with the optical measurement apparatus 301 according to the first comparative example.

SECOND COMPARATIVE EXAMPLE

Figure 8:
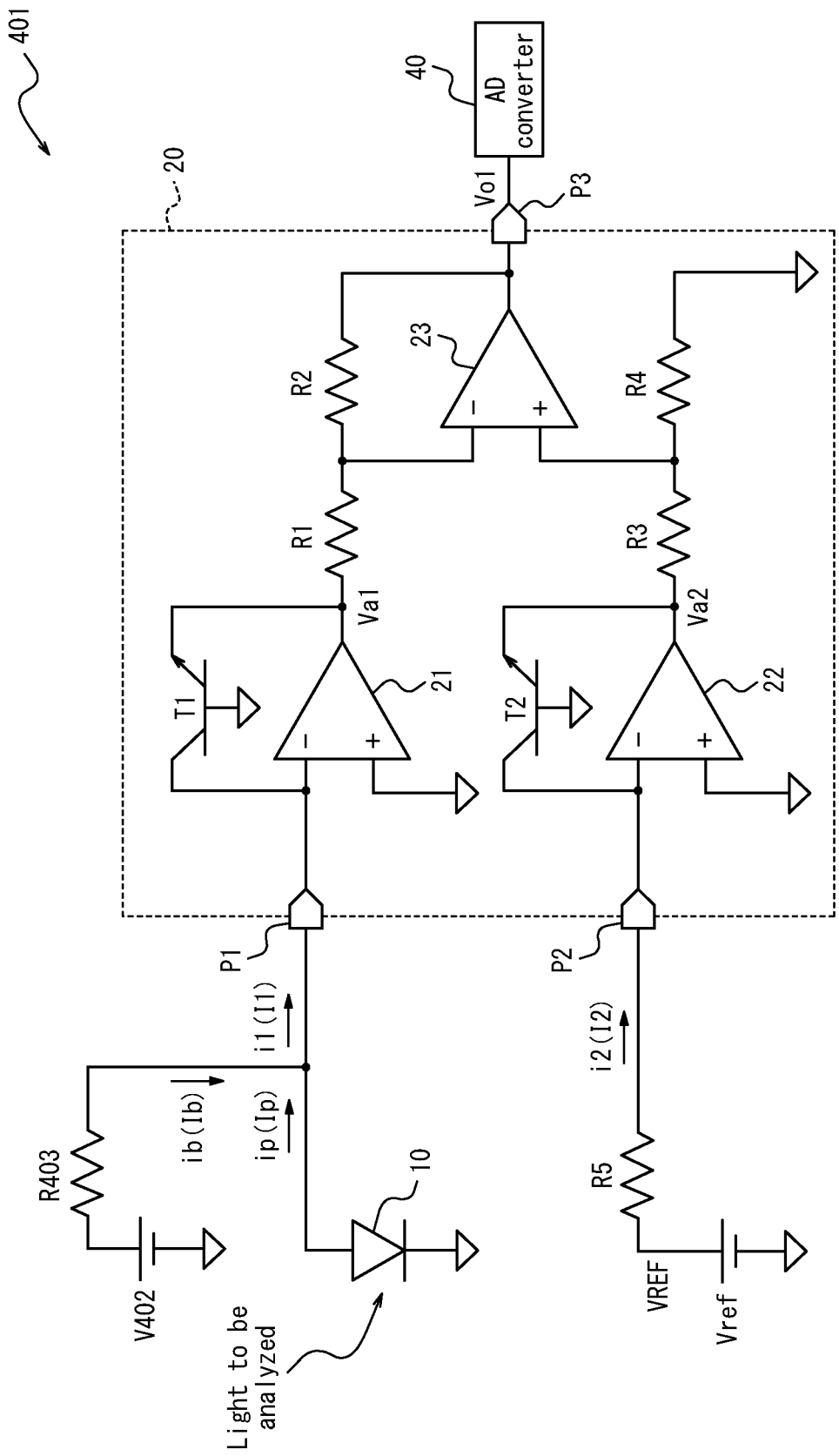
FIG. 8 illustrates an optical measurement apparatus provided with a logarithmic amplifier according to a second comparative example.

FIG. 8 illustrates an optical measurement apparatus 401 including a logarithmic amplifier for a second comparative example. An optical measurement apparatus 401 includes a photodiode 10, a logarithmic amplifier circuit 20, and a resistor R5. The optical measurement apparatus 401 has a resistor R403 in place of the switch unit 30 and the offset resistor R30 in the present embodiment.

In the second comparative example, a bias current ib is used to prevent latch-up of the amplifier 21 when the photodiode 10 is shaded. The current value of bias current ib is also referred to as "bias current value Ib". The bias current ib is input to the input terminal P1 in the same manner as the offset current ioff illustrated in FIG. 1. The bias current value Ib is set by the voltage of the voltage source V402 and the resistance value of the resistor R403. The resistor R403 is configured to include a fixed resistor. The resistor R403 has two terminals. One terminal of the resistor R403 is electrically connected to the input terminal P1. The other terminal of the resistor R403 is electrically connected to the voltage source 402.

Also in the second comparative example, the output voltage value Vo1 of the logarithmic amplifier circuit 20 is measured by the AD converter 40. However, unlike the present embodiment, the offset current value Ioff1 is not measured based on the output voltage value Vo1 in the second comparative example. In the second comparative example, the current value I1 calculated based on the output voltage value Vo1, the current value I2, and the equation (7) are substituted into the photocurrent value Ip in the equation (9) to measure the light intensity Pin. In other words, in the second comparative example, the light intensity Pin is measured based on the equation (9) assuming I1=Ip without subtracting the offset current value Ioff1 from the current value I1 according to the equation (8).

In the second comparative example, the current value I1 is the sum of the photocurrent value Ip and the bias current value Ib. Also in the second comparative example, as described above with reference to the equation (4), the resistance value Rt increases and the measurement sensitivity of the optical measurement apparatus 401 increases as the current value I1 decreases. Further, as described above with reference to the equation (5), as the current value I1 increases, the cutoff frequency fc increases and the frequency band of the amplifier 21 widens. With such a configuration, in the second comparative example, the measurement sensitivity of the optical measurement apparatus 401, the measurement speed of the optical measurement apparatus 401, and the frequency band of the amplifier 21 are adjusted by adjusting the bias current value Ib to thereby adjust the current value I1.

In the second comparative example, for adjusting the bias current value Ib, for example, a digital-to-analog converter may be employed as the voltage source V402 so that the voltage value of the voltage source V402 is made variable. Here, the voltage range of the voltage source V402 is limited by the power supply voltage of the optical measurement apparatus 401. As a result, for setting the bias current value Ib across a wide range, the resistance value of the resistor R403 needs to be set low. Setting the resistance value of the resistor R403 low permits the current value Ib to set high.

However, when the resistance value of the resistor R403 is set low, the gain relative to the non-inverting input terminal side of the amplifier 21, i.e., the noise gain, increases. Accordingly, even when the voltage value of the voltage source V402 is reduced to increase the measurement sensitivity, the noise level is not reduced. In the second comparative example, the resistance value of the resistor R403 needs to be increased to some extent for preventing an increase in the noise gain of the amplifier 21. For example, the resistance value of the resistor R403 is set to several gigaohms (GΩ).

As set forth above, in the second comparative example, the resistance value of the resistor R403 needs be increased to some extent for preventing an increase in the noise gain of the amplifier 21. As a result, the bias current value Ib cannot be set high in the second comparative example. Because the bias current value Ib cannot be set high in the second comparative example, the frequency band of the amplifier 21 cannot be widened. When the frequency band of the amplifier 21 cannot be widened, the waveform distorts at light wavelengths where the light intensity of light to be analyzed is reduced in the optical measurement apparatus 401, as will be explained below with reference to FIG. 9.

Figure 9:
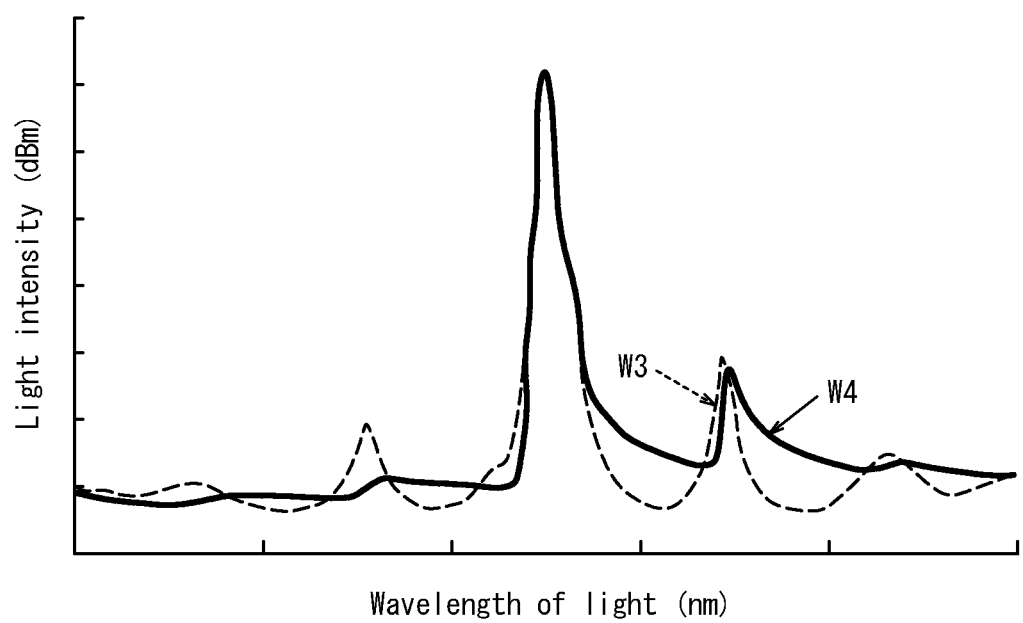
FIG. 9 illustrates waveforms of optical spectra according to the first and second comparative examples.

FIG. 9 is a diagram illustrating waveforms of optical spectra according to the first and second comparative examples. In FIG. 9, the horizontal axis represents the wavelength of light (nm). The vertical axis represents the light intensity (dBm). The waveform W3 is a waveform of an optical spectrum analyzed by the optical measurement apparatus 301 according to the first comparative example. The waveform W4 is a waveform of an optical spectrum analyzed by the optical measurement apparatus 401 according to the second comparative example. When the waveform W4 is compared with the waveform W3, distortions arise in the light wavelength range where the light intensity is reduced.

In contrast to the second comparative example, in the optical measurement apparatus 1 according to the present embodiment, as illustrated in FIG. 1, a variety of offset current values Ioff can be set by the offset resistors R30 having resistance values different from each other. In the optical measurement apparatus 1, an increase in the noise gain of the amplifier 21 can be prevented by electrically connecting an offset resistor R30 having a high resistance value between the voltage source Vb and the input terminal P1, to set the offset current value Ioff low, without reducing the voltage value VB of the voltage source Vb. Further, in the optical measurement apparatus 1, the offset current value Ioff can be set high by electrically connecting an offset resistor R30 having a low resistance value between the voltage source Vb and the input terminal P1. As a result, the frequency band of the amplifier 21 can be widened by setting the offset current value Ioff high while preventing an increase in the noise gain of the amplifier 21. Such a configuration reduces possible distortions of the waveform in light wavelength ranges where the light intensity is low, as illustrated in FIG. 9, in the optical measurement apparatus 1.

In the second comparative example, as described above, the offset current value Ioff1 is not measured based on the output voltage value Vo1. In other words, unlike the present embodiment, in the second comparative example, the light intensity Pin is measured assuming I1=Ip in the equation (9) without subtracting the offset current value Ioff1 from the current value I1 according to the equation (8). As a result, in the second comparative example, a photocurrent value Ip smaller than the bias current value Ib cannot be measured.

In contrast to the second comparative example, in the optical measurement apparatus 1 according to the first embodiment, the controller 52 calculates the photocurrent value Ip by subtracting the offset current value Ioff1 from the current value I1 according to the equation (8). Further, the controller 52 calculates the light intensity Pin based on the calculated photocurrent value Ip and the equation (9). In this manner, by calculating the photocurrent value Ip by subtracting the offset current value Ioff1 from the current value I1 according to the equation (8), the offset current value Ioff1 can be made greater than the bias current value Ib. By increasing the offset current value Ioff1, the measurement speed of the optical measurement apparatus 1 can be increased.

As described above, the performance of detection of the light intensity of light to be analyzed is improved in the optical measurement apparatus 1 according to the first embodiment.

Second Embodiment

Referring to FIG. 10, an optical measurement apparatus 101 includes a photodiode 10, a logarithmic amplifier circuit 20, a resistor R5, an AD converter 40, and an processing unit 2. The optical measurement apparatus 101 includes an amplifier 60 (second amplifier), a resistor R6, a resistor R7, a DA converter 70, a switch SW1 (first switch), a switch SW2 (second switch), a switch SW3 (third switch), a switch SW4 (fourth switch), and a switch SW5. The optical measurement apparatus 101 includes a switch unit 130, offset resistors R130-1 to R130-N, and capacitors C130-1 to C130-N.

Hereinafter, when the offset resistors R130-1 to R130-N are not specifically distinguished from each other, they may also be collectively referred to as "offset resistors R130". Further, when the capacitors C130-1 to C130-N are not specifically distinguished from each other, they may also be collectively referred to as "capacitor C130".

Each of the switches SW1 to SW5 is configured to include a mechanical relay, a photoMOS relay, an analog switch, or the like. The switches SW1 to SW5 may be configured as an analog multiplexer. Although the switch SW1 and the switch SW2 are illustrated as independent switches in FIG. 10, the switch SW1 and the switch SW2 may be configured as a single switch. In this case, the switches SW1 and SW2 are a switch for switching among the connections to the anode of the photodiode 10, and may be configured similarly to the switch SW5, for example. Further, although the switch SW2 and the switch SW3 are illustrated as independent switches in FIG. 10, the switch SW2 and the switch SW3 may be configured as a single switch. In this case, the switch SW2 and the switch 3 are a switch for switching among the connections to the inverting input terminal of the amplifier 60, and may be configured similarly to the switch SW5, for example.

The switch SW1 is capable of switching whether or not the input terminal P1 and the anode of the photodiode 10 are electrically connected. For example, the switch SW1 has two terminals. One terminal of the switch SW1 is electrically connected to the input terminal P1. The other terminal of the switch SW1 is electrically connected to the anode of the photodiode 10. The switch SW1 is turned on or off according to a control signal from the controller 52. When the switch SW1 is turned on, the input terminal P1 and the photodiode 10 are electrically connected. Or, when the switch SW1 is turned off, the input terminal P1 and the photodiode 10 are electrically disconnected.

The switch SW2 is capable of switching whether or not the anode of the photodiode 10 and the inverting input terminal of the amplifier 60 are electrically connected. For example, the switch SW2 has two terminals. One terminal of the switch SW2 is electrically connected to the anode of the photodiode 10. The other terminal of the switch SW2 is electrically connected to the inverting input terminal of the amplifier 60. The switch SW2 is turned on or off according to a control signal from the controller 52. When the switch SW2 is turned on, the anode of the photodiode 10 and the inverting input terminal of the amplifier 60 are electrically connected. When the switch SW2 is turned off, the anode of the photodiode 10 and the inverting input terminal of the amplifier 60 are electrically disconnected.

The switch SW3 is capable of switching whether or not the inverting input terminal of the amplifier 60 and the output terminal of the amplifier 60 are electrically connected. For example, the switch SW3 has two terminals. One terminal of the switch SW3 is electrically connected to the inverting input terminal of the amplifier 60. The other terminal of the switch SW3 is electrically connected to the output terminal of the amplifier 60. The switch SW3 is turned on or off according to a control signal from the controller 52. When the switch SW3 is turned on, the inverting input terminal of the amplifier 60 and the output terminal of the amplifier 60 are electrically connected. When the switch SW3 is turned off, the inverting input terminal of the amplifier 60 and the output terminal of the amplifier 60 are electrically disconnected.

The switch SW4 is capable of switching whether or not the non-inverting input terminal of the amplifier 60 is electrically connected to the reference potential. For example, the switch SW4 has two terminals. One terminal of the switch SW4 is electrically connected to the non-inverting input terminal of the amplifier 60 via the resistor R6. The other terminal of the switch SW4 is electrically connected to the reference potential. The switch SW4 is turned on or off according to a control signal from the controller 52. When the switch SW4 is turned on, the non-inverting input terminal of the amplifier 60 is electrically connected to the reference potential. When the switch SW4 is turned off, the non-inverting input terminal of the amplifier 60 is electrically disconnected from the reference potential.

The switch SW5 is capable of switching whether the output terminal of the amplifier 60 is electrically connected to the AD converter 40 or the output terminal P3 of the logarithmic amplifier circuit 20 is electrically connected to the AD converter 40. For example, the switch SW5 has three terminals. One of the terminals of the switch SW5 is electrically connected to the output terminal of the amplifier 60. One of the terminals of the switch SW5 is electrically connected to the output terminal P3 of the logarithmic amplifier circuit 20. One of the terminals of the switch SW5 is electrically connected to the AD converter 40. The switch SW5 switches whether the output terminal of the amplifier 60 is electrically connected to the AD converter 40 or the output terminal P3 of the logarithmic amplifier circuit 20 is electrically connected to the AD converter 40, according to a control signal from the controller 52.

The output terminal of the amplifier 60 is electrically connected to the switch SW5. The inverting input terminal of the amplifier 60 is electrically connected to the switch SW2 and the switch SW3. The non-inverting input terminal of the amplifier 60 is electrically connected to the resistor R6 and the resistor R7.

Each of the resistor R6 and the resistor R7 has two terminals. Each of the resistor R6 and resistor 7 is configured to include a fixed resistor. One terminal of the resistor R6 is electrically connected to the non-inverting input terminal of the amplifier 60. The other terminal of the resistor R6 is electrically connected to the switch SW4. One terminal of the resistor R7 is electrically connected to the non-inverting input terminal of the amplifier 60. The other terminal of the resistor R7 is electrically connected to the DA converter 70.

The DA converter 70 is a digital-to-analog converter. The DA converter 70 is electrically connected to the non-inverting input terminal of the amplifier 60 via the resistor R7. A control signal from the controller 52 in the form of a digital signal is input to the DA converter 70. The DA converter 70 converts the input digital signal into an analog signal. The DA converter 70 outputs the analog signal to the non-inverting input terminal of the amplifier 60 via the resistor R7. This DA converter 70 inputs a voltage according to a first mode or a second mode, which will be described below, to the non-inverting input terminal of the amplifier 60.

Each offset resistor R130 has two terminals. Each offset resistor R130 is configured to include a fixed resistor. The offset resistors R130-1 to R130-N have resistance values that are different from each other. For example, the resistance values of the offset resistors R130 increase by a factor of 10 from the offset resistor R130-1 to the offset resistor R130-N.

Each capacitor C130 has two terminals. Each capacitor C130 is electrically connected in parallel to the corresponding offset resistor R130. For example, one terminal of a capacitor C130 is electrically connected to one terminal of the offset resistor R130. The other terminal of the capacitor C130 is electrically connected to the other terminal of the offset resistor R130.

The capacitors C130 function as a feedback capacitance of the amplifier 60 in the second mode to be described below. The capacitance values of the capacitors C130 may be set appropriately based on the response characteristics of the amplifier 60 in the second mode to be described below.

The switch unit 130 is capable of switching an offset resistor R130 to be electrically connected between the output terminal of the amplifier 60 and the photodiode 10, of the offset resistors R130-1 to R130-N. The switch unit 130 is also capable of switching a capacitor C130 to be electrically connected between the output terminal of the amplifier 60 and the photodiode 10, of the capacitors C130-1 to C130-N. The switch unit 130 includes the changeover switches SW130-1 to S130-N.

Hereinafter, when the changeover switches SW130-1 to SW130-N are not specifically distinguished from each other, they are also referred to as "changeover switches SW130".

Each changeover switch SW130 has two terminals. Each changeover switch SW 130 is configured to include a mechanical relay, a photoMOS relay, an analog switch, or the like. Alternatively, the switch unit 130 may be configured as an analog multiplexer. In the case where the switch unit 130 is configured as an analog multiplexer, either terminals of the changeover switches SW130 to S130-N can be unified.

Hereinafter, the offset resistor R130 and the capacitor C130 corresponding to a changeover switch SW130-$i$ ($i$ is an integer from 1 to N) are also referred to as "offset resistor R130-$i$" and "capacitor C130-$i$", respectively.

One terminal of the changeover switch SW130-$i$ is electrically connected to the output terminal of the amplifier 60. The other terminal of the changeover switch SW130-$i$ is electrically connected to one terminal of the offset resistor R130-$i$ and one terminal of the capacitor C130-$i$. The other terminal of the offset resistor R130-$i$ and the other terminal of the capacitor C130-$i$ are electrically connected to the anode of the photodiode 10. Alternatively, one terminal of the changeover switch SW130-$i$ may be electrically connected to the anode of the photodiode 10. In this case, the other terminal of the changeover switch SW130-$i$ is electrically connected to one terminal of the offset resistor R130-$i$ and one terminal of the capacitor C130-$i$. Further, the other terminal of the offset resistor R130-$i$ and the other terminal of the capacitor C130-$i$ are electrically connected to the output terminal of the amplifier 60.

A control signal from the controller 52 is output to a changeover switch SW 130. The changeover switch SW130 is turned on or off according to the control signal from the controller 52. When the changeover switch SW130-$i$ is turned on, the offset resistor R130-$i$ and the capacitor C130-$i$ are connected between the output terminal of the amplifier 60 and the anode of the photodiode 10. Or, when the changeover switch SW130-$i$ is turned off, the offset resistor R130-$i$ and the capacitor C130-$i$ are electrically disconnected from the output terminal of the amplifier 60 and the anode of the photodiode 10.

The optical measurement apparatus 101 has a first mode and a second mode. The first mode is a mode in which the light intensity of light to be analyzed is measured based on the output voltage value Vo1 of the logarithmic amplifier circuit 20 as illustrated in FIG. 2, similarly to the first embodiment. The second mode is a mode in which the light intensity of light to be analyzed is measured based on the output voltage value Vo2 of the amplifier 60, as will be described below.

<First Mode>

The controller 52 receives an input for switching a mode of the optical measurement apparatus 101 via the input unit 51. This input is provided by the user via the input unit 51. In response to the controller 52 receiving this input via the input unit 51, the controller 52 switches the mode of the optical measurement apparatus 101 to the first mode.

The controller 52 outputs control signals to the switches SW1 to SW4 as appropriate to switch the connection states in the optical measurement apparatus 101 to the connection states corresponding to the first mode. In the first mode, the controller 52 turns on the switch SW1, turns off the switch SW2, turns on the switch SW3, and turns off the switch SW4.

In the first mode, the anode of the photodiode 10 and the input terminal P1 are electrically connected by the switch SW1, and the anode of the photodiode 10 and the inverting input terminal of the amplifier 60 are electrically disconnected by the switch SW2. Further, in the first mode, the inverting input terminal of the amplifier 60 and the output terminal of the amplifier 60 are electrically connected by the switch SW3, and the non-inverting input terminal of the amplifier 60 is electrically disconnected from the reference potential by the switch SW4.

The controller 52 outputs a control signal to the switch SW5 upon measuring the output voltage value Vo1 of the logarithmic amplifier circuit 20 in the first mode. The controller 52 outputs the control signal to the switch SW5 to cause the switch SW5 to electrically disconnect the output terminal of the amplifier 60 from the AD converter 40, and to electrically connect the output terminal P3 of the logarithmic amplifier circuit 20 to the AD converter 40. Such a configuration enables the controller 52 to measure the output voltage value Vo1 by the AD converter 40.

The controller 52 outputs a control signal to the switch SW5 when measuring the output voltage value Vo2 of the amplifier 60 in the first mode. The controller 52 outputs the control signal to the switch SW5 to cause the switch SW5 to electrically connect the output terminal of the amplifier 60 to the AD converter 40, and to electrically disconnect the output terminal P3 of the logarithmic amplifier circuit 20 from the AD converter 40. Such a configuration enables the controller 52 to measure the output voltage value Vo2 of the amplifier 60 by the AD converter 40.

In the first mode, the inverting input terminal of the amplifier 60 and the output terminal of the amplifier 60 are electrically connected by the switch SW3, so that the amplifier 60 functions as a voltage follower. As a result of the amplifier 60 functioning as the voltage follower, the output voltage value Vo2 of the amplifier 60 becomes equal to the voltage at the non-inverting input terminal of the amplifier 60. The voltage to be input to the non-inverting input terminal of the amplifier 60 is set by the DA converter 70, the resistor R6, and the resistor R7. In the first mode, the DA converter 70 functions as a voltage source Vb as illustrated in FIG. 1. As a result of the amplifier 60 functioning as the voltage follower, the output voltage value Vo2 of the amplifier 60 becomes equivalent to the voltage value VB of the voltage source Vb as illustrated in FIG. 1.

In the first mode, the switch unit 130 is capable of switching an offset resistor R130 to be electrically connected between the output terminal of the amplifier 60 and the input terminal P1, of the offset resistors R130-1 to R130-N. In the first mode, the offset resistor R130 electrically connected between the output terminal of the amplifier 60 and the input terminal P1 by the switch 130 causes the offset current ioff to be input to the input terminal P1 via the switch SW1.

<First Mode: Measurement Sensitivity Setting Processing>

The controller 52 receives an input of the measurement sensitivity for the first mode via the input unit 51 before processing of analyzing an optical spectrum, for example. The measurement sensitivity for the first mode is the measurement sensitivity of the optical measurement apparatus 101 to be set in the first mode. The measurement sensitivity for the first mode may be the one described above with reference to FIG. 3.

In the second embodiment, the storage 50 stores the measurement sensitivity for the first mode, switching information for the switch unit 130 for setting to that measurement sensitivity for the first mode, and information of the digital signal to be input to the DA converter unit 70 for setting to that measurement sensitivity for the first mode, in the manner that they are associated with each other. The switching information for the switch unit 130 includes information of the changeover switches SW 130 to be turned on and information of the changeover switches SW 130 to be turned off.

In response to the controller 52 receiving the measurement sensitivity for the first mode via the input unit 51, the controller 52 obtains, from the storage 50, the switching information of the switch unit 130 associated with the measurement sensitivity for the first mode and the information of the digital signal to be input to the DA converter unit 70. The controller 52 sets the output voltage value of the DA converter 70 by outputting a digital signal to the DA converter 70 based on the information of the obtained digital signal. Further, the controller 52 controls the switch unit 130 based on the obtained switching information for the switch unit 130 in the same manner as the switch unit 30 of the first embodiment.

<First Mode: Table Generation Processing>

Figure 11:
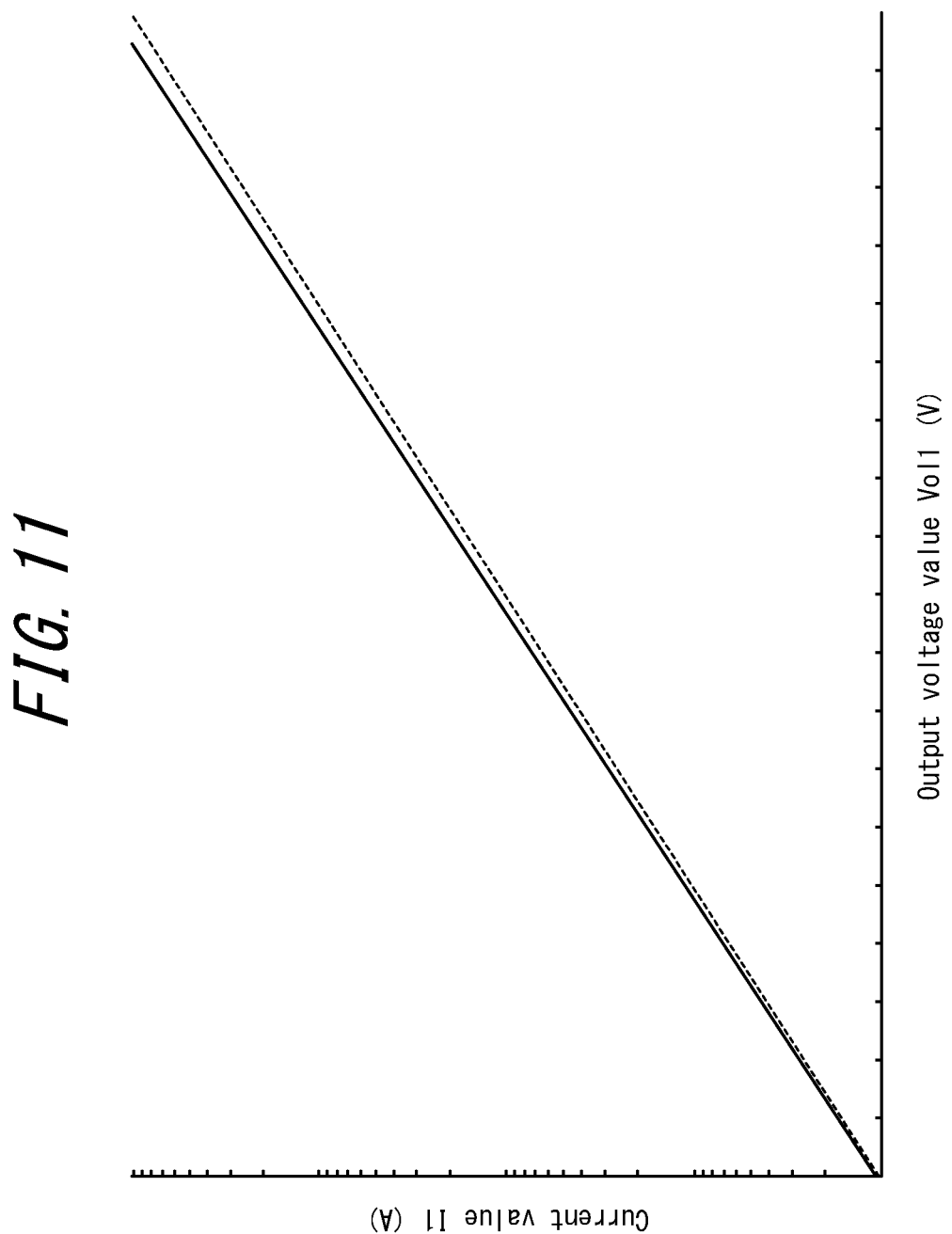
FIG. 11 is a graph indicating the relationship between output voltage values versus current values.

In the meantime, the actual relationship between the output voltage values Vo1 and the current values I1 may deviate from the relationship represented by the equation (7). FIG. 11 is a graph indicating the relationship between the output voltage value Vo1 and the current value I1. In FIG. 11, the horizontal axis represents the output voltage value Vo1 (V). Further, the vertical axis represents the current value I1 (A). In FIG. 11, the dashed line indicates the relationship between the output voltage value Vo1 and the current value I1 calculated according to the equation (7). The solid line indicates the relationship between the actual output voltage value Vo1 and the current value I1. As exemplified in FIG. 7, there is a deviation between the solid line and the dashed line. The amount of this deviation varies depending on the temperature.

Here, when the photodiode 10 is shaded, the photocurrent value Ip becomes 0 A (Ip=0) and the current value I1 becomes equal to the offset current value Ioff (I1=Ioff). Further, in the first mode, as described above, the output voltage value Vo2 of the amplifier 60 becomes equivalent to the voltage value VB of the voltage source Vb as illustrated in FIG. 1. Accordingly, in the second embodiment, the controller 52 can measure the current value I1 by measuring the output voltage value Vo2 of the amplifier 60 by the AD converter 40 when the photodiode 10 is shaded.

The controller 52 sets the offset current value Ioff, i.e., the current value I1, by changing the output voltage value of the DA converter unit 70 and by switching the switch unit 130. The controller 52 measures, by the AD converter 40, an output voltage value Vo1 and an output voltage value Vo2 when the photodiode 10 is shaded for each offset current value Ioff which has been set by appropriately switching the switch SW5. For example, the controller 52 outputs a control signal to the switch SW5 for each offset current value Ioff which has been set, to cause the switch SW5 to electrically connect the output terminal of the amplifier 60 to the AD converter 40, and to electrically disconnect the output terminal P3 of the logarithmic amplifier circuit 20 from the AD converter 40. The controller 52 measures, by the AD converter 40, the output voltage value Vo2 of the amplifier 60 for each offset current value Ioff which has been set. Further, the controller 52 outputs a control signal to the switch SW5 for each offset current value Ioff which has been set, to cause the switch SW5 to electrically disconnect the output terminal of the amplifier 60 from the AD converter 40, and to electrically connect the output terminal P3 of the logarithmic amplifier circuit 20 to the AD converter 40. The controller 52 measures, by the AD converter 40, the output voltage value Vo1 of the logarithmic amplifier circuit 20 for each offset current value Ioff which has been set.

The controller 52 generates a table as exemplified in FIG. 12 by associating, for each offset current value Ioff which has been set, the measured output voltage value Vo1 with a current value I1 calculated based on the measured output voltage value Vo2. The controller 52 calculates the offset current value Ioff, i.e., the current value I1, based on the measured output voltage value Vo2 and the equation (11).

$$Ioff = Vo2 / Rs130 \qquad \text{Equation (11)}$$

In the equation (11), the resistance value Rs130 is the resistance value of an offset resistor R130 electrically connected between the output terminal of the amplifier 60 and the input terminal P1 by the switch unit 130.

In a table as exemplified in FIG. 12, the output voltage values Vo1 in the form of digital data measured by the AD converter 40 are used. In FIG. 12, the output voltage values Vo1, i.e., AAA, BBB, and CCC, in the form of digital data are associated with the current values I1, i.e., aaa, bbb, and ccc, respectively. The controller 52 stores the generated table in the storage 50.

Here, the range of the offset current value Ioff that can be set by changing the output voltage value of the DA converter 70 and switching the switch unit 130 is the same as the range of the photocurrent value Ip corresponding to a wide range from +10 dBm to −90 dBm. The range of light intensity from +10 dBm to −90 dBm is similar to the measurement range of the second mode to be described below. The controller 52 can set a plurality of offset current values Ioff in a wide range, and can generate a table from the output voltage values Vo1 and Vo2 measured for the respective offset current values Ioff which have been set.

The controller 52 can calculate the light intensity of light to be analyzed by using the generated table in place of the equation (7). The current value I1 calculated according to the equation (7) deviates from the actual current value I1 as described above. By using the table, the light intensity of light to be analyzed is calculated based on the actual relationship between the output voltage values Vo1 and the current values I1. Such a configuration can provide a more accurate measurement of the light intensity of light to be analyzed.

Here, when all changeover switches SW130-1 to SW130-N are turned off, the offset current value Ioff becomes 0 A (Ioff=0) and the current value I1 becomes equal to the photocurrent value Ip (I1=Ip). The table can also be generated by inputting light to be analyzed with known light intensities to the photodiode 10 and measuring the output voltage values Vo1 of the logarithmic amplifier circuit 20 corresponding to the photocurrent values Ip calculated from the known light intensities of the light to be analyzed while changing the light intensities of the light to be analyzed. However, inputting the light to be analyzed with known light intensities to the photodiode 10 is cumbersome. Further, a temperature-induced change in the deviation amount between the current value I1 calculated according to the equation (7) and the actual current value I1 cannot be addressed without providing separate light to be analyzed. In contrast to such a configuration, in the present embodiment, Ioff can be set in a wide range by changing the output voltage value of the DA converter 70 and switching the switch unit 130 when the photodiode 10 is shaded, without inputting light to be analyzed with known light intensities to the photodiode 10. Further, in the present embodiment, the table can be generated by measuring the output voltage values Vo1 and the output voltage values Vo2 while switching the switch SW5. Accordingly, the table can be easily generated in the present embodiment. Hence, in the present embodiment, it is possible to address to a temperature-induced change in the deviation amount between the current value I1 calculated according to the equation (7) and the actual current value I1 by generating the table before carrying out light intensity measurement processing or periodically, for example.

It may be time-consuming to set a plurality of offset current values Ioff in a wide range and to measure the output voltage values Vo1 of the logarithmic amplifier circuit 20 and the output voltage values Vo2 of the amplifiers 60 for the respective offset current value Ioff which have been set for generating the table. Here, the temperature-induced change in the deviation amount between the current value I1 calculated according to the equation (7) and the actual current value I1 is dominated by a drift of the output voltage value Vo1. Accordingly, the controller 52 may measure the output voltage value Vo1 of the logarithmic amplifier circuit 20 and the output voltage value Vo2 of the amplifier 60 for one offset current value Ioff setting. The controller 52 then calculates, from the table, the output voltage value Vo1 corresponding to the offset current value Ioff calculated based on the measured output voltage value Vo2 and the equation (11). The controller 52 calculates the difference between the calculated output voltage value Vo1 and the measured output voltage value Vo1, and adds the difference to every output voltage value Vo1 in the table. By adding the difference to every output voltage value Vo1 in the table, the drift-induced change in the deviation amount can be reflected to the table. This configuration can reduce the time to generate the table. Here, the output voltage value of the DA converter 70 and the offset current value Ioff set by the switch unit 130 may equal as the current value I2.

<First Mode: Offset Current Value Measurement Processing>

Similarly to the first embodiment, the controller 52 measures the offset current value Ioff1 before carrying out light intensity measurement processing or periodically. In the second embodiment, the controller 52 measures the output voltage value Vo1 of the logarithmic amplifier circuit 20 by the AD converter 40 when the photodiode 10 is shaded by outputting a voltage value corresponding to each measurement sensitivity by the DA converter 70, and causing the switch unit 130 to set the offset current value Ioff corresponding to the each measurement sensitivity. The controller 52 sets the offset current value Ioff corresponding to the each measurement sensitivity by switching an offset resistor R130 to be electrically connected between the output terminal of the amplifier 60 and the input terminal P1. The controller 52 calculates the offset current value Ioff1 for the each measurement sensitivity based on the output voltage value Vo1 and the above-mentioned table. The controller 52 stores the offset current value Ioff1 associated with the measurement sensitivity in the storage 50. Instead, the controller 52 may calculate the offset current value Ioff1 based on the output voltage value Vo1 and the equation (6), similarly to the first embodiment.

<First Mode: Light Intensity Measurement Processing>

Before carrying out the light intensity measurement processing, the controller 52 outputs a control signal to the switch SW5. The controller 52 outputs the control signal to the switch SW5 to cause the switch SW5 to electrically disconnect the output terminal of the amplifier 60 from the AD converter 40, and to electrically connect the output terminal P3 of the logarithmic amplifier circuit 20 to the AD converter 40.

The controller 52 measures the output voltage value Vo1 of the logarithmic amplifier circuit 20 by the AD converter 40 when light to be analyzed is incident on the photodiode 10. The controller 52 calculates the light intensity of the light to be analyzed based on the measured output voltage value Vo1, the table as exemplified in FIG. 12 stored in the storage 50, the offset current value Ioff1 associated with the measurement sensitivity, and the equations (8) and (9). In other words, the controller 52 calculates the light intensity of the light to be analyzed using the table as exemplified in FIG. 12 instead of the equation (7). Such a configuration can provide an accurate measurement of the light intensity of light to be analyzed as described above. Instead, the controller 52 may calculate the light intensity of the light to be analyzed based on the output voltage value Vo1 and the equations (7) to (9), similarly to the first embodiment.

<Second Mode>

The controller 52 receives an input for switching the mode of the optical measurement apparatus 101 to the second mode via the input unit 51. This input is provided by the user via the input unit 51. In response to the controller 52 receiving this input via the input unit 51, the controller 52 switches the mode of the optical measurement apparatus 101 to the second mode.

The controller 52 outputs control signals to the switches SW1 to SW4 as appropriate to switch the connection states in the optical measurement apparatus 101 to the connection states corresponding to the second mode. In the second mode, the controller 52 turns off the switch SW1, turns on the switch SW2, turns off the switch SW3, and turns on the switch SW4.

In the second mode, the anode of the photodiode 10 and the input terminal P1 are electrically disconnected by the switch SW1, and the anode of the photodiode 10 and the inverting input terminal of the amplifier 60 are electrically connected by the switch SW2. Further, in the second mode, the inverting input terminal of the amplifier 60 and the output terminal of the amplifier 60 are electrically disconnected by the switch SW3, and the non-inverting input terminal of the amplifier 60 is electrically connected to the reference potential by the switch SW4.

The controller 52 outputs a control signal to the switch SW5 upon measuring the output voltage value Vo2 of the amplifier 60 in the second mode. The controller 52 outputs the control signal to the switch SW5 to cause the switch SW5 to electrically connect the output terminal of the amplifier 60 to the AD converter 40, and to electrically disconnect the output terminal P3 of the logarithmic amplifier circuit 20 from the AD converter 40. Such a configuration enables the controller 52 to measure the output voltage value Vo2 of the amplifier 60 by the AD converter 40.

In the second mode, the switch unit 130 is capable of switching an offset resistor R130 to be electrically connected between the output terminal of the amplifier 60 and the inverting input terminal of the amplifier 60, of the offset resistors R130-1 to R130-N. An offset resistor R130 electrically connected between the output terminal of the amplifier 60 and the inverting input terminal, and the amplifier 60 configure a linear amplifier. In other words, an offset resistor R130 electrically connected between the output terminal of the amplifier 60, and the inverting input terminal function as a feedback resistor of the amplifier 60. Hereinafter, the resistance value of an offset resistor R130 electrically connected between the output terminal of the amplifier 60 and the inverting input terminal in the second mode is also referred to as "feedback resistance value Rf130".

In the second mode, the switch unit 130 is capable of switching a capacitor C130 to be electrically connected between the output terminal of the amplifier 60 and the inverting input terminal of the amplifier 60, of the capacitors C130-1 to C130-N. A capacitor C130 electrically connected between the output terminal of the amplifier 60 and the inverting input terminal functions as a feedback capacitance of the amplifier 60. Hereinafter, the capacitance value of a capacitor C130 electrically connected between the output terminal of the amplifier 60 and the inverting input terminal in the second mode is also referred to as "feedback capacitance value Cf130".

<Second Mode: Measurement Sensitivity Setting Processing>

Before carrying out an analysis of an optical spectrum, for example, the controller 52 receives an input of the measurement sensitivity for the second mode via the input unit 51. The measurement sensitivity for the second mode is the measurement sensitivity of the optical measurement apparatus 101 to be set in the second mode.

In the second mode, the measurement sensitivity of the optical measurement apparatus 101 changes according to the resistance value of an offset resistor R130 electrically connected between the output terminal of the amplifier 60 and the inverting input terminal, i.e., the feedback resistance value Rf130. As the feedback resistance value Rf 130 increases, the measurement sensitivity of the optical measurement apparatus 101 increases and the noise level of the optical measurement apparatus 101 decreases. However, as the feedback resistance value Rf130 increases, the response speed of the amplifier 60 decreases and the measurement speed of the optical measurement apparatus 101 decreases accordingly. The cutoff frequency fc of the amplifier 60 is expressed by the equation (12).

$$fc = 1/(2\pi \times Rf130 \times Cf130) \qquad \text{Equation (12)}$$

In the equation (12), the feedback capacitance value Cf130 is the capacitance value of a capacitor C130 electrically connected between the output terminal of the amplifier 60 and the inverting input terminal, i.e., the feedback capacitance, as described above.

The equation (12) indicates that the cutoff frequency fc increases and the frequency band of the amplifier 60 widens as the feedback resistance value Rf130 decreases. It also indicates that the cutoff frequency fc increases and the frequency band of the amplifier 60 widens as the feedback capacitance value Cf130 decreases. However, as the feedback capacitance value Cf130 decreases, the high-frequency noise of the amplifier 60 increases. Hence, in the present embodiment, the feedback capacitance value Cf130 is limited to a certain value, and the cutoff frequency fc is adjusted by the feedback resistance value Rf130.

In summary, in the second mode, as the feedback resistance value Rf130 increases, the measurement sensitivity for the second mode increases. As the measurement sensitivity for the second mode increases, the frequency band of the amplifier 60 narrows and the measurement speed of the optical measurement apparatus 101 decreases. Further, in the second mode, as feedback resistance value Rf decreases, the measurement sensitivity for the second mode decreases. As the measurement sensitivity for the second mode decreases, the frequency band of the amplifier 60 widens and the measurement speed of the optical measurement apparatus 101 increases.

For the above reasons, in the second mode, the maximum feedback resistance value Rf130 is set to each measurement sensitivity for the second mode received via the input unit 51. The feedback resistance value Rf130 is adjusted based on the output voltage value Vo2 of the amplifier 60 so as not to exceed this maximum feedback resistance value Rf130. Note that data of the maximum feedback resistance value Rf130 may be stored in the storage 50 while being associated with the measurement sensitivity for the second mode.

Here, in the second mode, the light intensity of light to be analyzed is calculated based on the output voltage value Vo2 of the amplifier 60, as will be described below, in the light intensity measurement processing. This output voltage value Vo2 increases as the light intensity of light to be analyzed increases. When the output voltage value Vo2 increases to some extent, an accuracy of the light intensity of light to be analyzed based on this output voltage value Vo2 may not be guaranteed because the supply voltage of the linear amplifier is limited. In other words, in the second mode, when the light intensity of light to be analyzed increases to some extent, it is desirable to reduce the feedback resistance value Rf130 to thereby reduce the output voltage value Vo2.

As an example, the controller 52 measures the output voltage value Vo2 of the amplifier 60 by the AD converter 40 in the light intensity measurement processing to be described below. In this case, the controller 52 determines whether or not the absolute value of the output voltage value Vo2 is within a predetermined range. The upper limit of the predetermined range may be set based on the maximum rated voltage value of the output voltage value Vo2 of the amplifier 60, or based on the maximum value of the absolute value of the output voltage value Vo2 that guarantees the measurement accuracy of the light intensity. The lower limit of the predetermined range may be set based on the feedback resistance value Rf130 that is one step higher than the present feedback resistance value Rf130, and the upper limit of the predetermined range, or based on the minimum value of the absolute value of the output voltage value Vo2 that guarantees the measurement accuracy of the light intensity.

If the controller 52 determines that the absolute value of the output voltage value Vo2 is within the predetermined range, the controller 52 measures the light intensity of the light to be analyzed based on the output voltage value Vo2, as will be described below in the description of the light intensity measurement processing.

Otherwise, if the controller 52 determines that the absolute value of the output voltage value Vo2 exceeds the predetermined range, the controller 52 controls the switch unit 130 to switch the present feedback resistance value Rf130 to the feedback resistance value Rf130 which is one step lower. When the absolute value of the output voltage value Vo2 exceeds the predetermined range, it is highly likely that the light intensity of the light to be analyzed cannot be calculated accurately based on the output voltage value Vo2 because the supply voltage of the linear amplifier is limited. When the absolute value of the output voltage value Vo2 exceeds the predetermined range, the present feedback resistance value Rf130 is switched to a feedback resistance value Rf130 that is one step lower. As a result, the output voltage value Vo2 can be reduced so as to be lower than the present voltage value. Such a configuration can provide an accurate calculation of the light intensity of the light to be analyzed based on the output voltage value Vo2 after the feedback resistance value Rf130 is switched.

Otherwise, if the controller 52 determines that the absolute value of the output voltage value Vo2 is below the predetermined range, the controller 52 controls the switch unit 130 to switch the present feedback resistance value Rf130 to a feedback resistance value Rf130 that is one step higher. When the absolute value of the output voltage value Vo2 is below the predetermined range, it is highly likely that the light intensity of the light to be analyzed cannot be calculated accurately based on the output voltage value Vo2 due to noises or other factors. When the absolute value of the output voltage value Vo2 is below the predetermined range, the present feedback resistance value Rf130 is switched to a feedback resistance value Rf130 that is one step higher than the present measurement sensitivity Rf130. As a result, the measurement sensitivity of the optical measurement apparatus 101 is increased so as to be higher than the present measurement sensitivity. Such a configuration can provide an accurate calculation of the light intensity of the light to be analyzed based on the output voltage value Vo2 after the feedback resistance value Rf130 is switched.

<Second Mode: Light Intensity Measurement Processing>

Before carrying out the light intensity measurement processing, the controller 52 outputs a control signal to the switch SW5. The controller 52 outputs the control signal to the switch SW5 to cause the switch SW5 to electrically connect the output terminal of the amplifier 60 to the AD converter 40, and to electrically disconnect the output terminal P3 of the logarithmic amplifier circuit 20 from the AD converter 40.

The controller 52 measures, by the AD converter 40, the output voltage value Vo2 of the amplifier 60 when the light to be analyzed is incident on the photodiode 10. The relationship between the output voltage value Vo2 and the photocurrent value Ip is expressed by the equation (13).

$$Vo2 = -Rf130 \times Ip + Voff \qquad \text{Equation (13)}$$

In the equation (13), the feedback resistance value Rf130 is the resistance value of an offset resistor R130 electrically connected between the output terminal of the amplifier 60 and the inverting input terminal of the amplifier 60, as described above. The voltage value Voff is the output voltage value Vo2 of the amplifier 60 when the potential difference between the inverting input terminal and the inverting input terminal of the amplifier 60 is 0 V, in other words, the output offset voltage value of the amplifier 60.

For reducing the voltage value Voff in the equation (13), in the configuration illustrated in FIG. 10, a voltage obtained by dividing the voltage output from the DA converter 70 between the resistors R6 and R7 is input to the non-inverting input terminal of the amplifier 60. The voltage value Voff is about several millivolts (mV). The resistance value of the resistor R6 is set, for example, to several ohms ($\Omega$), and the resistance value of the resistor R7 is set sufficiently higher than the resistance value of the resistor R6. The voltage value Voff is stored in the storage 50 while being associated with the feedback resistance value Rf130, as will be described below.

The controller 52 calculates the photocurrent value Ip based on the voltage value Voff obtained from the storage 50, the measured output voltage value Vo2, and the equation (13). The controller 52 calculates the light intensity Pin of the light to be analyzed based on the calculated photocurrent value Ip and the equation (9).

Here, if the user wishes to measure the light intensity of pulsed light, the user can switch the mode of the optical measurement apparatus 101 to the second mode by inputting, via the input unit 51, an input to switch the mode of the optical measurement apparatus 101 to the second mode. The linear amplifier in the second mode can measure a time-averaged value of the light intensities of pulsed light more easily than the logarithmic amplifier, for example. For example, a time-averaged value of the light intensities of pulsed light can be measured by the linear amplifier by increasing the feedback capacitance value Cf130 of the linear amplifier. In such a case, in the second mode, the controller 52 may cause the switch unit 130 to electrically connect a capacitor C130 having a feedback capacitance value Cf130 corresponding to the period of the pulsed light, between the output terminal of the amplifier 60 and the inverting input terminal of the amplifier 60. Further, a low-pass filter may be provided between the output terminal of the amplifier 60 and the AD converter 40. The time-averaged value of the light intensities of pulsed light can be measured by measuring the output voltage value of the amplifier 60 by the AD converter 40 through the low-pass filter.

The 1/f noise of the logarithmic amplifier in the first mode may exceed the 1/f noise of the linear amplifier in the second mode. As a result, the measurement sensitivity of the optical measurement apparatus 101 may not be set as high in the first mode as in the second mode. In such a case, if the light intensity of light to be analyzed is low and the user thus wishes to set the measurement sensitivity of the optical measurement apparatus 101 higher, the user can switch the mode of the optical measurement apparatus 101 to the second mode.

<Second Mode: Adjustment Processing of Voltage Value Voe and Measurement Processing of Voltage Value Voff>

When the photodiode 10 is shaded, the equation (13) is expressed by the equation (14).

$$Vo2 = Voff \qquad \text{Equation (14)}$$

The equation (14) indicates that the voltage value Voff can be measured by measuring the output voltage value Vo2 of the amplifier 60 when the photodiode 10 is shaded.

Here, the voltage value Voff is expressed by the equation (15).

$$Voff = (1 + Rf130/Rpd) \times (Voe + r6/(r6+r7) \times Vo3) \qquad \text{Equation (15)}$$

In the equation (15), the voltage value Voe is the input offset voltage value of the amplifier 60. The resistance value Rpd is the parallel resistance value of the photodiode 10. The resistance value r6 is the resistance value of the resistor R6. The resistance value r7 is the resistance value of the resistor R7. The output voltage value Vo3 is the output voltage value that is output by the DA converter 70.

The controller 52 may adjust the output voltage value of the DA converter 70 for cancelling out the voltage value Voe. For example, when the feedback resistance value Rf130 equals the minimum value thereof, the effects of the noise gain of the linear amplifier is reduced and the relationship between the voltage value Voff and the voltage value Voe can thus be expressed by the equation (16).

$$Voff \cong Voe + r6/(r6+r7) \times Vo3 \qquad \text{Equation (16)}$$

As indicated by the equation (16), when the feedback resistance value Rf130 equals the minimum value thereof, the output voltage value Vo3 for cancelling out the voltage value Voe can be determined by measuring the voltage value Voff.

The controller 52 controls the switch unit 130 to set the feedback resistance value Rf 130 to the minimum value, and measures the output voltage value Vo2 of the amplifier 60 when the photodiode 10 is shaded, i.e., the voltage value Voff, by the AD converter 40. The controller 52 calculates the output voltage value Vo3 of the DA converter 70 for setting the voltage value Voff to 0 V according to the equation (16). The controller 52 identifies a digital signal to be input to the DA converter 70 to cause the DA converter 70 to output the calculated output voltage value Vo3. The controller 52 inputs this digital signal to the DA converter 70 to cancel out the voltage value Voe. The controller 52 stores the information of this digital signal in the storage 50.

Such a configuration can reduce the error of the voltage value Voff from 0 V when the feedback resistance value Rf130 equals the minimum value thereof. However, when the feedback resistance value Rf130 has a value other than the minimum value, the error of the voltage value Voff from 0 V increases because the error is amplified by the noise gain.

For this reason, the controller 52 measures the output voltage value Vo2 of the amplifier 60 when the photodiode 10 is shaded, i.e., the voltage values Voff, for each feedback resistance value Rf 130 by the AD converter 40 while switching the switch unit 130. The controller 52 stores, in the storage 50, the measured voltage value Voff and the feedback resistance value Rf130 at the time when the voltage value Voff is measured in the manner that they are associated with each other. The controller 52 stores, in the storage 50, the measured voltage value Voff and the switching information for the switch unit 130 for setting to the feedback resistance value Rf130 at the time when the voltage value Voff is measured in the manner that they are associated with each other.

The controller 52 may not adjust the output voltage value Vo3 of the DA converter 70 for cancelling out the voltage value Voe. In this case, the controller 52 measures the voltage value Voff for each feedback resistance value Rf130 as described above, and stores, in the storage 50, the measured voltage value Voff and the feedback resistance value Rf130 at the time when the voltage value Voff is measured in the manner that they are associated with each other.

The controller 52 may periodically adjust the output voltage value Vo3 of the DA converter 70 for cancelling out the voltage value Voe. Further, the controller 52 may periodically measure the voltage value Voff for each feedback resistance value Rf130. The voltage value Voe varies as the temperature of the optical measurement apparatus 101 changes. Periodical adjustments of the output voltage value Vo3 of the DA converter 70 for cancelling out the voltage value Voe can provide an accurate measurement of the light intensity of light to be analyzed in the second mode. Further, periodical measurements of the voltage value Voff for each feedback resistance value Rf130 can provide a more accurate measurement of the light intensity of light to be analyzed in the second mode.

<Operation of Optical Measurement System>

Figure 13:
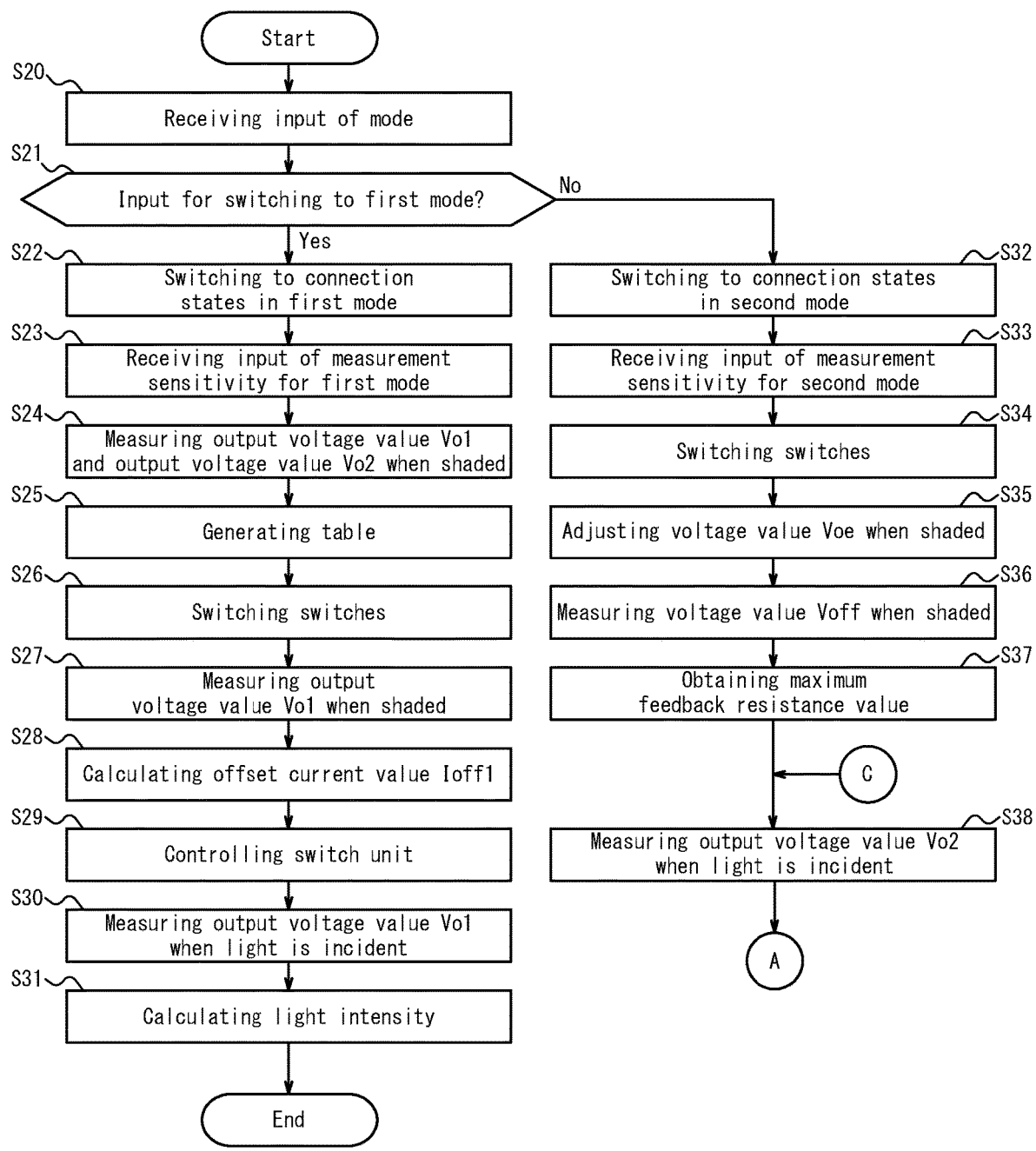
FIG. 13 is a flowchart illustrating an example of an optical measurement method by the optical measurement apparatus illustrated in FIG. 10 (part 1)
Figure 14:
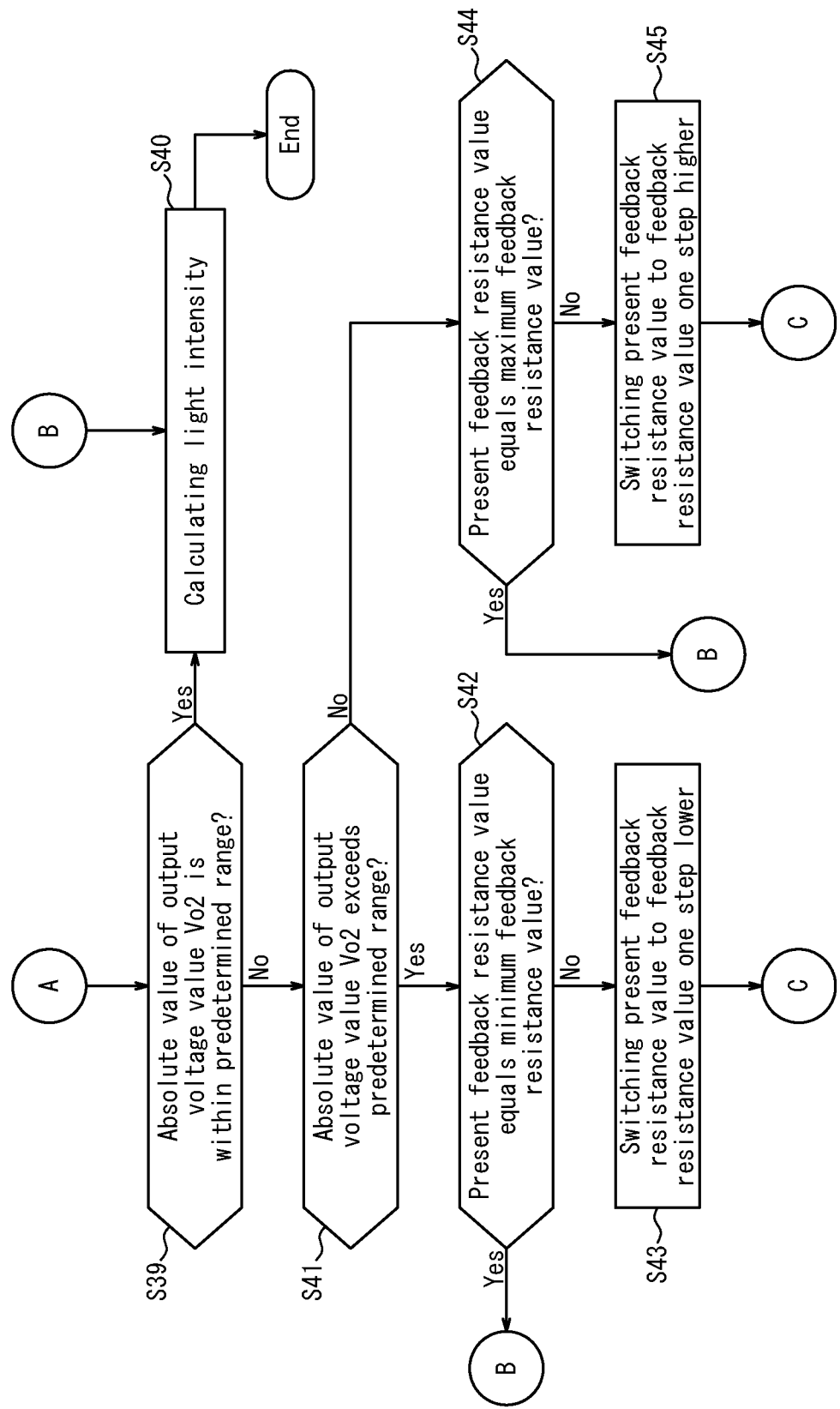
FIG. 14 is a flowchart illustrating the example of the optical measurement method by the optical measurement apparatus illustrated in FIG. 10 (part 2)

FIGS. 13 and 14 are flowcharts illustrating an example of an optical measurement method by the optical measurement apparatus 101 illustrated in FIG. 10. The optical measurement method may be implemented as an optical measurement program which is executed by a processor such as the controller 52. The optical measurement program may be stored on a non-transitory computer-readable medium. In response to the controller 52 detecting an input for switching the mode of the optical measurement apparatus 101 by the input unit 51, the controller 52 starts the processing of Step S20 as illustrated in FIG. 13.

In the process of step 20, the controller 52 receives, via the input unit 51, the input for switching the mode of the optical measurement apparatus 101. The controller 52 determines whether or not this input is an input for switching to the first mode (Step S21). If the controller 52 determines that this input is an input for switching to the first mode (Yes in Step S21), it proceeds to the processing of Step S22. Otherwise, if the controller 52 determines that this input is an input for switching to the second mode (No in Step S21), it proceeds to the processing of Step S32.

In the processing of Step S22, the controller 52 outputs control signals to the switches SW1 to SW4 as appropriate to switch the connection states in the optical measurement apparatus 101 to the connection states corresponding to the first mode.

In the processing of Step S23, the controller 52 receives an input of the measurement sensitivity for the first mode via the input unit 51.

Before the processing of Step S24 is carried out, the photodiode 10 is shaded. In the processing of Step S24, the controller 52 sets offset current values Ioff, i.e., the current values I1, by changing the output voltage value of the DA converter 70 and by switching the switch unit 130. The controller 52 measures, by the AD converter 40, an output voltage value Vo1 and an output voltage value Vo2 when the photodiode 10 is shaded for each offset current value Ioff which has been set by appropriately switching the switch SW5.

In the processing of Step S25, the controller 52 generates a table as exemplified in FIG. 12 by associating, for each offset current value Ioff which has been set, the output voltage value Vo1 measured in the processing of Step S24 with the current value I1 calculated based on the output voltage value Vo2 measured in the processing of Step S24. The controller 52 calculates the offset current value Ioff, i.e., the current value I1, based on the measured output voltage value Vo2 and the equation (11).

In the processing of Step S26, the controller 52 outputs a control signal to the switch SW5 to cause the switch SW5 to electrically disconnect the output terminal of the amplifier 60 from the AD converter 40 and to electrically connect the output terminal P3 of the logarithmic amplifier circuit 20 to the AD converter 40.

Before the processing of Step S27 is carried out, the photodiode 10 is shaded. In the processing of Step S27, the controller 52 obtains, from the storage 50, the switching information for the switch unit 130 for setting to each measurement sensitivity, and the information of the digital signal to be input to the DA converter unit 70 for setting to the each measurement sensitivity. Based on the obtained information, the controller 52 measures, by the AD converter 40, the output voltage value Vo1 of the logarithmic amplifier circuit 20 while outputting the output voltage value corresponding to the each measurement sensitivity by the DA converter 70 and setting the offset current value Ioff corresponding to the each measurement sensitivity by the switch unit 130.

In the processing of Step S28, the controller 52 calculates the offset current value Ioff1 based on the output voltage value Vo1 measured in the processing of Step S27 and the table generated in the processing of Step S25. The controller 52 stores, in the storage 50, the offset current value Ioff1 associated with each measurement sensitivity for the first mode.

In the processing of Step S29, the controller 52 obtains, from the storage 50, the switching information for the switch unit 130 for setting to the measurement sensitivity for the first mode received in the processing of Step S23 and the information of the digital signal to be input to the DA converter unit 70 for setting to that measurement sensitivity for the first mode. The controller 52 controls the DA converter 70 and the switch unit 130 based on the obtained information.

Before the processing of Step S30 is carried out, the photodiode 10 is set such that light to be analyzed can pass through the photodiode 10. In the processing of Step S30, light to be analyzed is input to the photodiode 10 while the light wavelengths are swept. In the processing of Step S30, the controller 52 measures, by the AD converter 40, the output voltage value Vo1 of the logarithmic amplifier circuit 20 when the light to be analyzed is incident on the photodiode 10.

In the processing of Step S31, the controller 52 calculates the light intensity of the light to be analyzed based on the output voltage value Vo1 measured in the processing of Step S30, the table generated in the processing of Step S25, and the equations (8) and (9).

In the processing of Step S32, the controller 52 outputs control signals to the switches SW1 to SW4 as appropriate to switch the connection states in the optical measurement apparatus 101 to the connection states corresponding to the second mode.

In the processing of Step S33, the controller 52 receives an input of the measurement sensitivity for the second mode via the input unit 51.

In the processing of Step S34, the controller 52 outputs a control signal to the switch SW5 to cause the switch SW5 to electrically connect the output terminal of the amplifier 60 to the AD converter 40 and to electrically disconnect the output terminal P3 of the logarithmic amplifier circuit 20 from the AD converter 40.

Before the processing of Step S35 is carried out, the photodiode 10 is shaded. In the processing of Step S35, the controller 52 controls the switch unit 130 to set the feedback resistance value Rf130 to the minimum value, and measures the output voltage value Vo2 of the amplifier 60 when the photodiode 10 is shaded, i.e., the voltage value Voff, by the AD converter 40. In the processing of Step S35, the controller 52 identifies a digital signal to be input to the DA converter 70 to set the voltage value Voff to 0 V. The controller 52 inputs the identified digital signal to the DA converter 70 to cancel out the voltage value Voe.

Before the processing of Step S36 is carried out, the photodiode 10 is shaded. In the processing of Step S36, the controller 52 measures, by the AD converter 40, the output voltage value Vo2 of the amplifier 60 when the photodiode 10 is shaded, i.e., the voltage value Voff, for each feedback resistance value Rf130 while switching the switch unit 130.

In the processing of Step S37, the controller 52 obtains, from the storage 50, the data of the maximum feedback resistance value Rf130 associated with the measurement sensitivity for the second mode received in the processing of Step S33. The controller 52 controls the switch unit 130 to set the feedback resistance value Rf130 to an intermediate value between the minimum feedback resistance value Rf130 and the obtained maximum feedback resistance value Rf130. This minimum feedback resistance value Rf130 is the smallest feedback resistance value Rf130 of the feedback resistance values Rf130 that can be set by the offset resistor R130.

Before the processing of Step S38 is carried out, the photodiode 10 is set such that light to be analyzed can pass through the photodiode 10. Further, before the processing of Step S38 is carried out, the controller 52 outputs the digital signal identified in the processing of Step S35 to the DA converter 70. In the processing of Step S38, light to be analyzed is input to the photodiode 10. In the processing of Step S38, the controller 52 measures the output voltage value Vo2 of the amplifier 60 by the AD converter 40 when the light to be analyzed is incident on the photodiode 10.

After the processing of Step S38 is carried out, the controller 52 proceeds to the processing of Step S39 as illustrated in FIG. 14.

In the processing of Step S39, the controller 52 determines whether or not the absolute value of the output voltage value Vo2 measured in the processing of Step S38 is within a predetermined range. If the controller 52 determines that the absolute value of the output voltage value Vo2 is within the predetermined range (Yes in Step S39), it proceeds to the processing of Step S40. Otherwise, if the controller 39 determines that the absolute value of the output voltage value Vo2 is out of the predetermined range (No in Step S39), it proceeds to the processing of Step S41.

In the processing of Step S40, the controller 52 calculates the photocurrent value Ip based on the voltage value Voff measured in the processing of Step S36, the measured output voltage value Vo2, and the equation (13). In the processing of Step S40, the controller 52 calculates the light intensity Pin of the light to be analyzed based on the photocurrent value Ip and the equation (9).

In the processing of Step S41, the controller 52 determines whether or not the absolute value of the output voltage value Vo2 measured in the processing of Step S38 exceeds the predetermined range. If the controller 52 determines that the absolute value of the output voltage value Vo2 exceeds the predetermined range (Yes in Step S41), it proceeds to the processing of Step S42. Otherwise, if the controller 52 does not determine that the absolute value of the output voltage value Vo2 exceeds the predetermined range (No in Step S41), in other words, if the absolute value of the output voltage value Vo2 is below the predetermined range, the controller 52 proceeds to the processing of Step S44.

In the processing of Step S42, the controller 52 determines whether or not the present feedback resistance value Rf130 equals the minimum feedback resistance value Rf130. If the controller 52 determines that the present feedback resistance value Rf130 equals the minimum feedback resistance value Rf130 (Yes in Step S42), it proceeds to the processing of Step S40. Otherwise, if the controller 52 determines that the present feedback resistance value Rf130 does not equal the minimum feedback resistance value Rf130 (No in Step S42), it proceeds to the processing of Step S43.

In the processing of Step S43, the controller 52 controls the switch unit 130 to switch the present feedback resistance value Rf130 to a feedback resistance value Rf130 that is one step lower. After the processing of Step S43 is carried out, the controller 52 returns to the processing of Step S38.

In the processing of Step S44, the controller 52 determines whether or not the present feedback resistance value Rf130 equals the maximum feedback resistance value Rf130 obtained in the processing of Step S37. If the controller 52 determines that the present feedback resistance value Rf130 equals the maximum feedback resistance value Rf130 (Yes in Step S44), it proceeds to the processing of Step S40. Otherwise, if the controller 52 determines that the present feedback resistance value Rf130 does not equal the maximum feedback resistance value Rf130 (No in Step S44), it proceeds to the processing of Step S45.

In the processing of Step S45, the controller 52 controls the switch unit 130 to switch the present feedback resistance value Rf130 to a feedback resistance value Rf130 that is one step higher. After the processing of Step S45 is carried out, the controller 52 returns to the processing of Step S38.

The controller 52 may not carry out the processing of Steps S24 to S25, S26 to S28, S35, and S36 if the controller 52 carries out the processing of Steps S24 to S25, S26 to S28, S35, and S36 in advance, for example.

Further, the controller 52 may periodically carry out the processing of Steps S24 to S25, S26 to S28, S35, and S36 at any timing. When Steps S24 to S25, S26 to S28, S35, and S36 are carried out, the user may manually shade the photodiode 10 or the optical measurement apparatus 101 may be configured so that the photodiode 10 is automatically shaded, as described above in the first embodiment.

As described above, in the second embodiment, the offset resistors R130 can be used as a feedback resistor of the amplifier 60, as well as being used for adjusting the offset current value Ioff. Such a configuration can provide an optical measurement apparatus 101 that configures both a logarithmic amplifier and a linear amplifier, while achieving a reduction in costs and reduction in the footprint. Additionally, because the optical measurement apparatus 101 has the first mode and the second mode, the user can appropriately switch the mode of the optical measurement apparatus 101 to the first mode or the second mode depending on the light to be analyzed, for example.

Other configurations and effects of the optical measurement apparatus 101 according to the second embodiment are the same as those of the optical measurement apparatus 1 according to the first embodiment.

Third Embodiment

Figure 15:
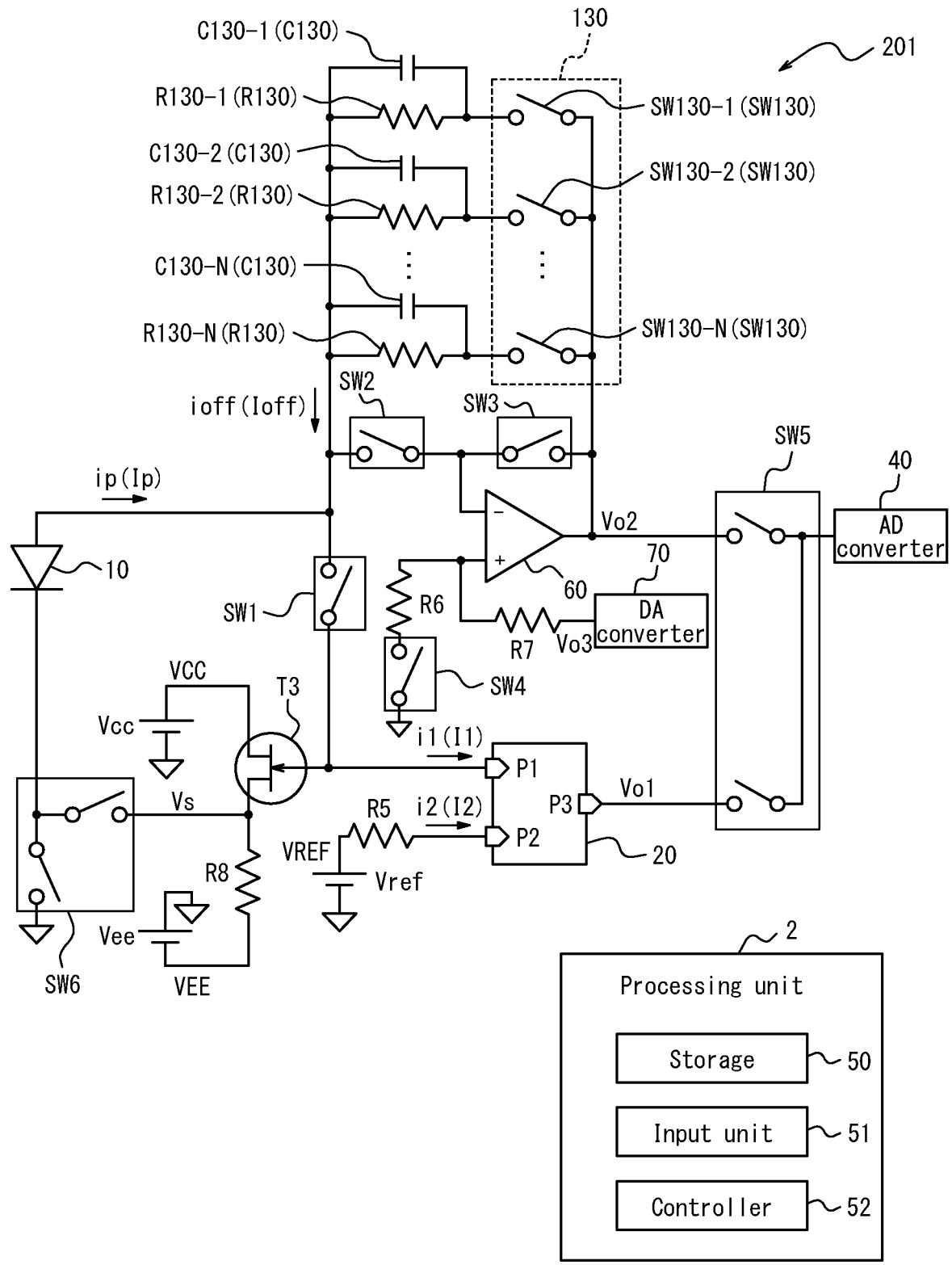
FIG. 15 is a block diagram of an optical measurement apparatus according to a third embodiment of the present disclosure.

Referring to FIG. 15, an optical measurement apparatus 201 includes a photodiode 10, a logarithmic amplifier circuit 20, a resistor R5, a resistor R6, a resistor R7, an AD converter 40, an processing unit 2, an amplifier 60, a DA converter 70, a switch SW1, a switch SW2, a switch SW3, a switch SW4, a switch SW5, a switch unit 130, offset resistors R130-1 to R130-N, and capacitors C130-1 to C130-N. The optical measurement apparatus 201 includes a transistor T3, a resistor R8, and a switch SW6 (fifth switch).

The transistor T3 is a depletion type N-channel field effect transistor (FET). The transistor T3 is, for example, a depletion-type N-channel junction field effect transistor (JFET). Instead, the transistor T3 may be a depletion-type N-channel metal-oxide semiconductor field-effect transistor (MOSFET).

The gate of the transistor T3 is electrically connected to the input terminal P1 of the logarithmic amplifier circuit 20. The drain of the transistor T3 is electrically connected to the voltage source Vcc. The voltage source Vcc supplies a voltage value having a voltage value VCC. The voltage value VCC is a positive voltage value. The voltage value being a voltage value VCC is input to the drain of the transistor T3. The source of the transistor T3 is electrically connected to the voltage source Vee via the resistor R8. The voltage source Vee supplies a voltage having a voltage value VEE. The voltage value VEE is a negative voltage value. The voltage having a voltage value VEE is input to the source of the transistor T3 via the resistor R8. In transistor T3, the drain and source are functionally indistinguishable. Therefore, in the description of the present embodiment, even if the drain and the source of the transistor T3 are exchanged, the transistor T3 functions similarly regardless of whether they are exchanged or not.

The resistor R8 has two terminals. The resistor R8 is configured to include a fixed resistor. One terminal of the resistor 8 is electrically connected to the source of the transistor T3. The other terminal of the resistor R8 is electrically connected to the voltage source Vee. The resistance value of the resistor R8 is set appropriately based on the desired source voltage value of the transistor T3.

The switch SW6 is configured to include a mechanical relay, a photoMOS relay, an analog switch, or the like. The switch SW6 may be configured as an analog multiplexer.

The switch SW6 is capable of switching whether the cathode of the photodiode 10 is electrically connected to the reference potential or to the source of the transistor T3. For example, the switch SW6 has three terminals. One of the terminals of the switch SW6 is electrically connected to the cathode of the photodiode 10. One of the terminals of the switch SW6 is electrically connected to the source of the transistor T3. One of the terminals of the switch SW6 is electrically connected to the reference potential. The switch SW6 switches whether the cathode of the photodiode 10 is electrically connected to the reference potential or to the source of the transistor T3 according to a control signal from the controller 52.

Similarly to the second embodiment, the optical measurement apparatus 201 has a first mode and a second mode.

<First Mode>

Similarly to the second embodiment, the controller 52 receives an input for switching the mode of the optical measurement apparatus 201 to the first mode via the input unit 51. In response to receiving this input, the controller 52 outputs control signals to the switches SW1 to SW4 as appropriate to switch the connection states in the optical measurement apparatus 201 to the connection states corresponding to the first mode, similarly to the second embodiment.

Similarly to the second embodiment, the controller 52 outputs a control signal to the switch SW5 upon measuring the output voltage value Vo1 of the logarithmic amplifier circuit 20 in the first mode. The controller 52 outputs the control signal to the switch SW5 to cause the switch SW5 to electrically disconnect the output terminal of the amplifier 60 from the AD converter 40, and to electrically connect the output terminal P3 of the logarithmic amplifier circuit 20 to the AD converter 40.

Similarly to the second embodiment, the controller 52 outputs a control signal to the switch SW5 upon measuring the output voltage value Vo2 of the amplifier 60 in the first mode. The controller 52 outputs the control signal to the switch SW5 to cause the switch SW5 to electrically connect the output terminal of the amplifier 60 to the AD converter 40, and to electrically disconnect the output terminal P3 of the logarithmic amplifier circuit 20 from the AD converter 40.

<First Mode: Light Intensity Measurement Processing>

Similarly to the second embodiment, before carrying out light intensity measurement processing, the controller 52 outputs a control signal to the switch SW5. The controller 52 outputs the control signal to the switch SW5 to cause the switch SW5 to electrically disconnect the output terminal of the amplifier 60 from the AD converter 40, and to electrically connect the output terminal P3 of the logarithmic amplifier circuit 20 to the AD converter 40.

In the third embodiment, the controller 52 outputs a control signal to the switch SW6 before carrying out the light intensity measurement processing. The controller 52 outputs a control signal to the switch SW6 to cause the switch SW6 to electrically disconnect the cathode of the photodiode 10 from the reference potential, and to electrically connect the cathode of the photodiode 10 to the source of the transistor T3.

The gate of the transistor T3 is electrically connected to the anode of the photodiode 10 via the switch SW1. The source of the transistor T3 is electrically connected to the cathode of the photodiode 10 via the switch SW6. The voltage value of the anode relative to the cathode of the photodiode 10 becomes equal to the voltage value of the gate to the source of the transistor T3. Here, because the transistor T3 is a depletion type transistor, the transistor T3 can be turned on even when the voltage value of the gate of the transistor T3 is a negative voltage value relative to the source of the transistor T3. Such a configuration permits a reverse bias to be input to the photodiode 10. Further, the reverse bias that is input to the photodiode 10 is maintained at the voltage value of the gate relative to the source of the transistor T3. In other words, the transistor T3 functions as a bootstrap circuit.

Because the reverse bias that is input to the photodiode 10 is maintained to the voltage value of the gate relative to the source of the transistor T3, the capacitance value of the photodiode 10 relative to the input terminal P1 of the logarithmic amplifier circuit 20 is equivalently reduced. Equivalently reducing the capacitance value of the photodiode 10 can reduce the recovery time, as will be described below with reference to FIG. 16.

Figure 16:
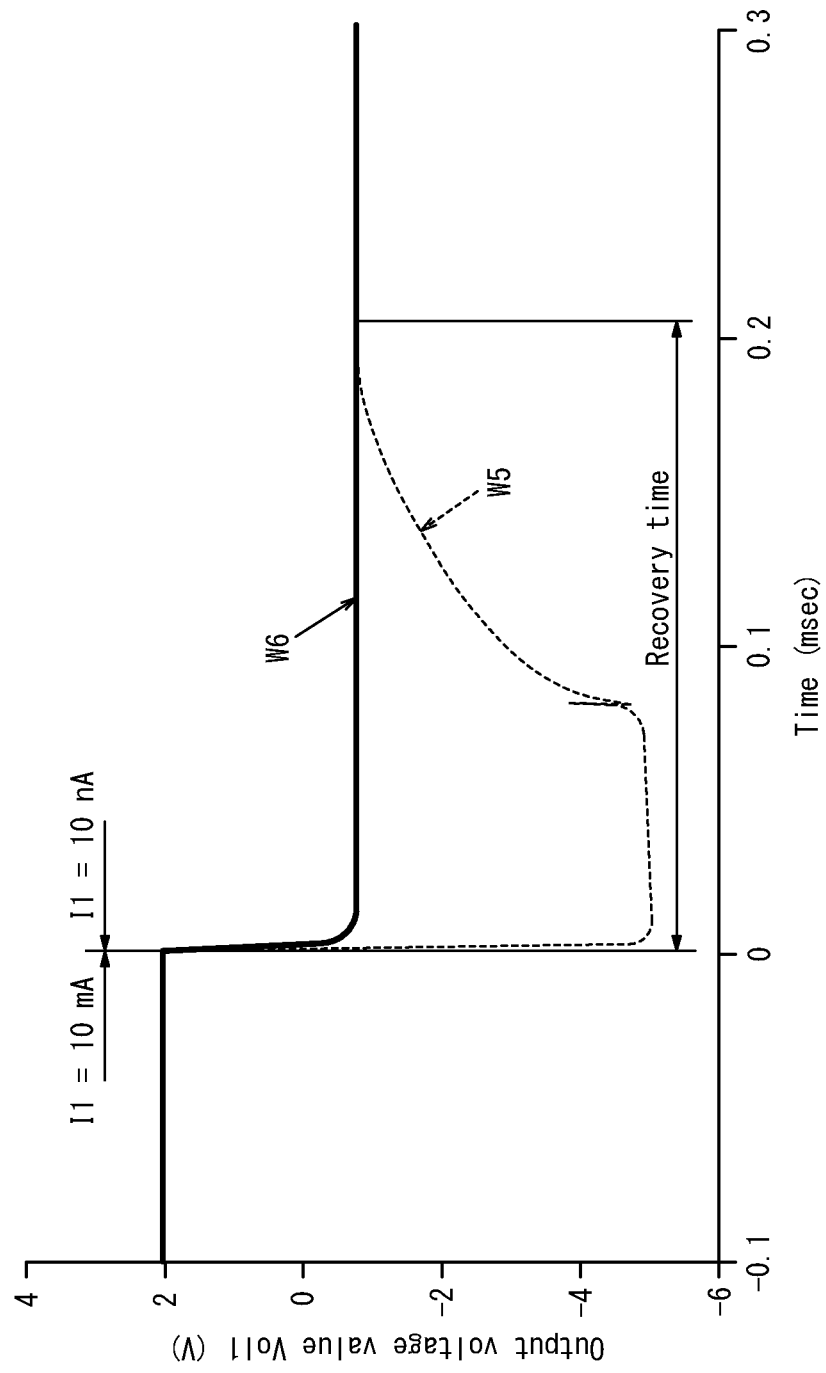
FIG. 16 is a diagram illustrating waveforms of output voltage values of an amplified logarithmic circuit illustrated in FIG. 15.

FIG. 16 illustrates waveforms of the output voltage value Vo1 of the logarithmic amplifier circuit 20 illustrated in FIG. 15. In FIG. 16, the horizontal axis represents time (msec). The vertical axis represents the output voltage value Vo1 (V). At time of 0 msec, the current value I1 drops abruptly from 10 mA to 10 nA.

The waveform W5 is a waveform of the output voltage value Vo1 in an optical measurement apparatus without a transistor T3. The waveform W6 is a waveform of an output voltage value Vo1 in the optical measurement apparatus 201 provided with the transistor T3.

When the current value I1 drops abruptly, the amplifier 21 as illustrated in FIG. 2 may not be able to respond to the abrupt change in the current value I1 and a current may continue to flow from the collector to the emitter of the transistor T1 as illustrated in FIG. 2. When the current continues to flow from the collector to the emitter of the transistor T1, the voltage value that is input to the input terminal P1 becomes a negative value. When the voltage value that is input to the input terminal P1 becomes a negative value, the current flowing from the emitter to the collector of the transistor T1 becomes very small and the output voltage value Va1 of the amplifier 21 thus saturates to a positive voltage value. When the output voltage value Va1 of the amplifier 21 saturates to the positive voltage value, the output voltage value Vo1 of the logarithmic amplifier circuit 20 saturates to a negative voltage value.

When the output voltage value Vo1 saturates to the negative voltage value, as indicated by the waveform W5, the optical measurement apparatus without the transistor T3 requires recovery time until the output voltage value Vo1 recovers to a voltage value corresponding to the current value I1. The recovery time of the waveform W5 is about 0.2 msec.

In contrast, in the present embodiment, because the capacitance value of the photodiode 10 can be equivalently reduced by the transistor T3, the recovery time is reduced as indicated by the waveform W6.

Here, the recovery time could be reduced by increasing the offset current value Ioff. However, when the offset current value Ioff is increased, noises of the logarithmic amplifier circuit 20 may be increased. The present embodiment can reduce the recovery time through provision of the transistor T3 without increasing the offset current value Ioff. Such a configuration can reduce the recovery time while reducing an increase in noises of the logarithmic amplifier circuit 20.

The recovery time could also be reduced by reducing the light-receiving area of the photodiode 10 to thereby reduce the capacitance value of the photodiode 10. However, if the photosensitive area of photodiode 10 is reduced, the efficiency of coupling of light to be analyzed to the photodiode 10 is reduced. The present embodiment can reduce the recovery time through provision of the transistor T3 without reducing the photosensitive area of the photodiode 10. Such a configuration can reduce the recovery time while preventing a reduction in the efficiency of coupling of light to be analyzed to the photodiode 10.

<First Mode: Measurement Sensitivity Setting Processing>

The source voltage value of the transistor T3 is determined by the current characteristic of the transistor T3 and the resistance value of the resistor R8. For example, the source voltage value of the transistor T3 is about 1 V. When the source voltage value of the transistor T3 becomes 0 V or higher, thereby causing the source of the transistor T3 to be electrically connected to the cathode of photodiode 10, a dark current having a current value of several nanoampere (nA) to several tens picoampere (pA) may be generated.

For this reason, in the third embodiment, the controller 52 adjusts the output voltage value of the DA converter 70 as will be described below. Information of the digital signal to be input to the DA converter 70 to cause the DA converter 70 to output the adjusted output voltage value is stored in the storage 50 for each measurement sensitivity.

Similarly to the second embodiment, the controller 52 receives an input of the measurement sensitivity for the first mode via the input unit 51 before processing of analyzing an optical spectrum, for example. In response to receiving this input, the controller 52 obtains information of the digital signal for adjusting the output voltage value of the DA converter 70 associated with the measurement sensitivity for the first mode. The controller 52 outputs a digital signal to the DA converter 70 based on the obtained information. Similarly to the second embodiment, the controller 52 obtains, from the storage 50, the switching information for the switch unit 130 associated with the measurement sensitivity for the first mode. The controller 52 controls the switch unit 130 based on the obtained switching information for the switch unit 130, similarly to the second embodiment.

<First Mode: Table Generation Processing>

The controller 52 outputs a control signal to the switch SW6 upon generating a table as exemplified in FIG. 12. The controller 52 outputs the control signal to the switch SW6 to cause the switch SW6 to electrically connect the cathode of the photodiode 10 to the reference potential, and to electrically disconnect the cathode of the photodiode 10 from the source of the transistor T3. Such a configuration enables generation of a table illustrated in FIG. 12 without being affected by a dark current.

<First Mode: Offset Current Value Measurement Processing>

Similarly to the second embodiment, the controller 52 measures the offset current value Ioff1 before carrying out light intensity measurement processing or periodically, for example.

In the third embodiment, the controller 52 outputs a control signal to the switch SW6 before carrying out the measurement processing of the offset current value. The controller 52 causes the switch SW6 to electrically disconnect the cathode of the photodiode 10 from the reference potential, and to electrically connect the cathode of the photodiode 10 to the source of the transistor T3.

Similarly to the second embodiment, the controller 52 measures the output voltage value Vo1 of the logarithmic amplifier circuit 20 by the AD converter 40 when the photodiode 10 is shaded by outputting a voltage value corresponding to each measurement sensitivity by the DA converter 70, and causing the switch unit 130 to set the offset current value Ioff corresponding to the each measurement sensitivity. Further, the controller 52 calculates the offset current value Ioff1 for the each measurement sensitivity based on the output voltage value Vo1 and the above-mentioned table.

The controller 52 stores the offset current value Ioff1 associated with the measurement sensitivity in the storage 50. Instead, the controller 52 may calculate the offset current value Ioff1 based on the output voltage value Vo1 and the equation (6), similarly to the first embodiment.

Here, in the third embodiment, the offset current value Ioff1 may differ significantly from the offset current value Ioff for each sensitivity setting as exemplified in FIG. 3 due to the effects of a dark current. The offset current value Ioff1 can vary with the output voltage value of the DA converter 70. For this reason, the controller 52 identifies a digital signal to be input to the DA converter 70 when the offset current value Ioff1 becomes equal to the offset current value as exemplified in FIG. 3. For example, when the measurement sensitivity for the first mode is the sensitivity A as exemplified in FIG. 3, the resistance value of the offset resistor R130 to be electrically connected between the output terminal of the amplifier 60 and the input terminal P1 is set to 1 MΩ, which is the same as the resistance value Rs30 as exemplified in FIG. 3. When the measurement sensitivity for the first mode is the sensitivity A, the controller 52 identifies a digital signal to be input to the DA converter 70 when the offset current value Ioff1 becomes 200 nA. The controller 52 stores information of the identified digital signal in the storage 50 while associating it with the measurement sensitivity for the first mode.

Other processing in the first mode is the same as the processing in the second embodiment.

<Second Mode>

Similarly to the second embodiment, the controller 52 receives an input for switching the mode of the optical measurement apparatus 201 to the second mode via the input unit 51. In response to receiving this input, the controller 52 outputs control signals to the switches SW1 to SW4 as appropriate to switch the connection states in the optical measurement apparatus 201 to the connection states corresponding to the second mode, similarly to the second embodiment.

Similarly to the second embodiment, the controller 52 outputs a control signal to the switch SW5 upon measuring the output voltage value Vo2 of the amplifier 60 in the second mode. The controller 52 outputs the control signal to the switch SW5 to cause the switch SW5 to electrically connect the output terminal of the amplifier 60 to the AD converter 40, and to electrically disconnect the output terminal P3 of the logarithmic amplifier circuit 20 from the AD converter 40.

<Second Mode: Light Intensity Measurement Processing>

Similarly to the second embodiment, before carrying out light intensity measurement processing, the controller 52 outputs a control signal to the switch SW5. The controller 52 outputs the control signal to the switch SW5 to cause the switch SW5 to electrically connect the output terminal of the amplifier 60 to the AD converter 40, and to electrically disconnect the output terminal P3 of the logarithmic amplifier circuit 20 from the AD converter 40.

Here, as described above, when the source voltage value of the transistor T3 becomes 0 V or higher, a dark current having a current value of several nanoampere (nA) to several tens picoampere (pA) may be generated.

For this reason, the controller 52 outputs a control signal to the switch SW6 before carrying out the light intensity measurement processing. The controller 52 outputs a control signal to the switch SW6 to cause the switch SW6 to electrically connect the cathode of the photodiode 10 to the reference potential, and to electrically disconnect the cathode of the photodiode 10 from the source of the transistor T3. Such a configuration reduces generation of a dark current described above in the optical measurement apparatus 201, to thereby reduce an increase in noises of the optical measurement apparatus 201.

Other processing in the second mode is the same as the processing in the second embodiment.

<Operation of Optical Measurement System>

An optical measurement method by the optical measurement apparatus 201 of the third embodiment may be carried out as described above with reference to FIGS. 13 and 14.

Note that, in the third embodiment, in the processing of Step S24, the controller 52 outputs a control signal to the switch SW6 before measurements of the output voltage value Vo1 and the output voltage value Vo2. The controller 52 outputs the control signal to the switch SW6 to cause the switch SW6 to electrically connect the cathode of the photodiode 10 to the reference potential, and to electrically disconnect the cathode of the photodiode 10 from the source of the transistor T3.

Further, in the third embodiment, in the processing of Step S26, the controller 52 controls the switch SW6 in addition to the control on the switch SW5. In the processing of Step S26, the controller 52 outputs a control signal to the switch SW6. The controller 52 outputs the control signal to the switch SW6 to cause the switch SW6 to electrically disconnect the cathode of the photodiode 10 from the reference potential, and to electrically connect the cathode of the photodiode 10 to the source of the transistor T3.

Further, in the third embodiment, in the processing of Step S34, the controller 52 controls the switch SW6 in addition to the control on the switch SW5. In the processing of Step S34, the controller 52 outputs a control signal to the switch SW6 to cause the switch SW6 to electrically connect the cathode of the photodiode 10 to the reference potential, and to electrically disconnect the cathode of the photodiode 10 from the source of the transistor T3.

Other configurations and effects of the optical measurement apparatus 201 according to the third embodiment are the same as those of the optical measurement apparatus 1 according to the first embodiment or the optical measurement apparatus 101 according to the second embodiment.

Although the embodiments of the present disclosure have been described with reference to the drawings and examples, it is to be noted that a person skilled in the art can easily make a wide variety of variations or modifications based on the present disclosure. Accordingly, it is noted that such variations or modifications are encompassed within the scope of the present disclosure. For example, functions included in the components and the steps can be rearranged unless they are logically inconsistent, or multiple components or steps can be combined into one or a single component or step may be divided.

For example, in the above-described embodiments, the transistor T1 as a nonlinear element has been described as being electrically connected between the output terminal of the amplifier 21 and a non-inverting input terminal. Instead, a nonlinear element other than the transistor T1 may be electrically connected between the output terminal of the amplifier 21 and the non-inverting input terminal.

For example, an analog-to-digital converter may be employed as the voltage source Vb as illustrated in FIG. 1. By employing an analog-to-digital converter as the voltage source Vb, the voltage value VB can be made variable.

For example, the optical measurement apparatus 1 as illustrated in FIG. 1 may include a transistor T3, a resistor R8, and a switch SW6 as illustrated in FIG. 15.

For example, the optical measurement apparatus 1 as illustrated in FIG. 1 may generate a table as exemplified in FIG. 12, and may measure the light intensity of light to be analyzed using the table instead of the equation (7). Upon generating the table in the optical measurement apparatus 1, light to be analyzed with a known light intensity is input to the photodiode 10 while the offset current value Ioff is set to 0 A. In other words, the current value I1 becomes equal to a known photocurrent value Ip. The controller 52 measures the output voltage value Vo1 of the logarithmic amplifier circuit 20 by the AD converter 40 while varying the known photocurrent value Ip, i.e., the current value I1. The controller 52 generates a table by associating the photocurrent value Ip with the output voltage value Vo1.

The invention claimed is:

1. An optical measurement apparatus comprising:
a light receiving element capable of converting a light intensity of light to be analyzed into an electrical signal;
an input terminal to which the electrical signal is input;
a first amplifier and a nonlinear element configuring a logarithmic amplifier, an inverting input terminal of the first amplifier being electrically connected to the input terminal;
a plurality of offset resistors having resistance values different from each other;
a switch unit capable of switching an offset resistor to be electrically connected between a voltage source and the input terminal, of the plurality of offset resistors; and
a controller, wherein
an offset current is input to the input terminal by the offset resistor electrically connected between the voltage source and the input terminal,
the controller measures the light intensity based on an output voltage value of the logarithmic amplifier, and
the controller adjusts the offset current by switching the offset resistor to be electrically connected between the voltage source and the input terminal, and is capable of changing a measurement sensitivity of the optical measurement apparatus in stages.

2. The optical measurement apparatus according to claim 1, wherein
the controller measures a current value of the offset current based on the output voltage value of the logarithmic amplifier when the light receiving element is shaded.

3. The optical measurement apparatus according to claim 1, wherein
the controller calculates the light intensity of the light to be analyzed by subtracting a current value of the offset current calculated based on the output voltage value of the logarithmic amplifier when the light receiving element is shaded, from a current value calculated based on the output voltage value of the logarithmic amplifier when the light to be analyzed is incident on the light receiving element.

4. The optical measurement apparatus according to claim 1, further comprising:
a second amplifier having a non-inverting input terminal electrically connected to the voltage source;
a first switch capable of switching whether or not the light receiving element and the input terminal are electrically connected;
a second switch capable of switching whether or not the light receiving element and an inverting input terminal of the second amplifier are electrically connected;
a third switch capable of switching whether or not the inverting input terminal of the second amplifier and an output terminal of the second amplifier are electrically connected; and
a fourth switch capable of switching whether or not the non-inverting input terminal of the second amplifier is electrically connected to a reference potential, wherein the plurality of offset resistors are provided between the light receiving element and the output terminal of the second amplifier.

5. The optical measurement apparatus according to claim 4, wherein
the optical measurement apparatus has a first mode for measuring the light intensity based on the output voltage value of the logarithmic amplifier and a second mode for measuring the light intensity based on an output voltage value of the second amplifier,
in the first mode, the light receiving element and the input terminal are electrically connected by the first switch, the light receiving element and the inverting input terminal of the second amplifier are electrically disconnected by the second switch, the inverting input terminal of the second amplifier and the output terminal of the second amplifier are electrically connected by the third switch, and the non-inverting input terminal of the second amplifier is electrically disconnected from the reference potential by the fourth switch, and
in the first mode, the offset current is input to the input terminal via the offset resistor electrically connected between the output terminal of the second amplifier and the input terminal.

6. The optical measurement apparatus according to claim 5, wherein
the voltage source is a digital-to-analog converter.

7. The optical measurement apparatus according to claim 5, wherein
the controller measures the current value of the offset current based on the output voltage value of the second amplifier when the light receiving element is shaded in the first mode.

8. The optical measurement apparatus according to claim 7, wherein
the controller:
measures the output voltage value of the logarithmic amplifier and the output voltage value of the second amplifier when the light receiving element is shaded for each current value of the offset current while switching the switch unit, and generates a table by associating the measured output voltage value of the logarithmic amplifier with a current value of the offset current calculated based on the measured output voltage value of the second amplifier, and
measures the light intensity of the light to be analyzed based on the output voltage value of the logarithmic amplifier when the light to be analyzed is incident on the light receiving element and the table.

9. The optical measurement apparatus according to claim 7, further comprising
a transistor being a depletion type N-channel field effect transistor, wherein
the light receiving element is a photodiode,
an anode of the photodiode is electrically connected to the first switch and the second switch, and
a gate of the transistor is electrically connected to the input terminal, a source of the transistor is electrically connected to a cathode of the photodiode, and a voltage having a positive voltage value is input to a drain of the transistor.

10. The optical measurement apparatus according to claim 9, further comprising:
a fifth switch capable of switching whether the cathode of the photodiode is electrically connected to the reference potential or to the source of the transistor,
in the second mode, the cathode of the photodiode is electrically connected to the reference potential by the fifth switch.

* * * * *